INVENTOR
Richard La France,
By J. F. Rule
His attorney

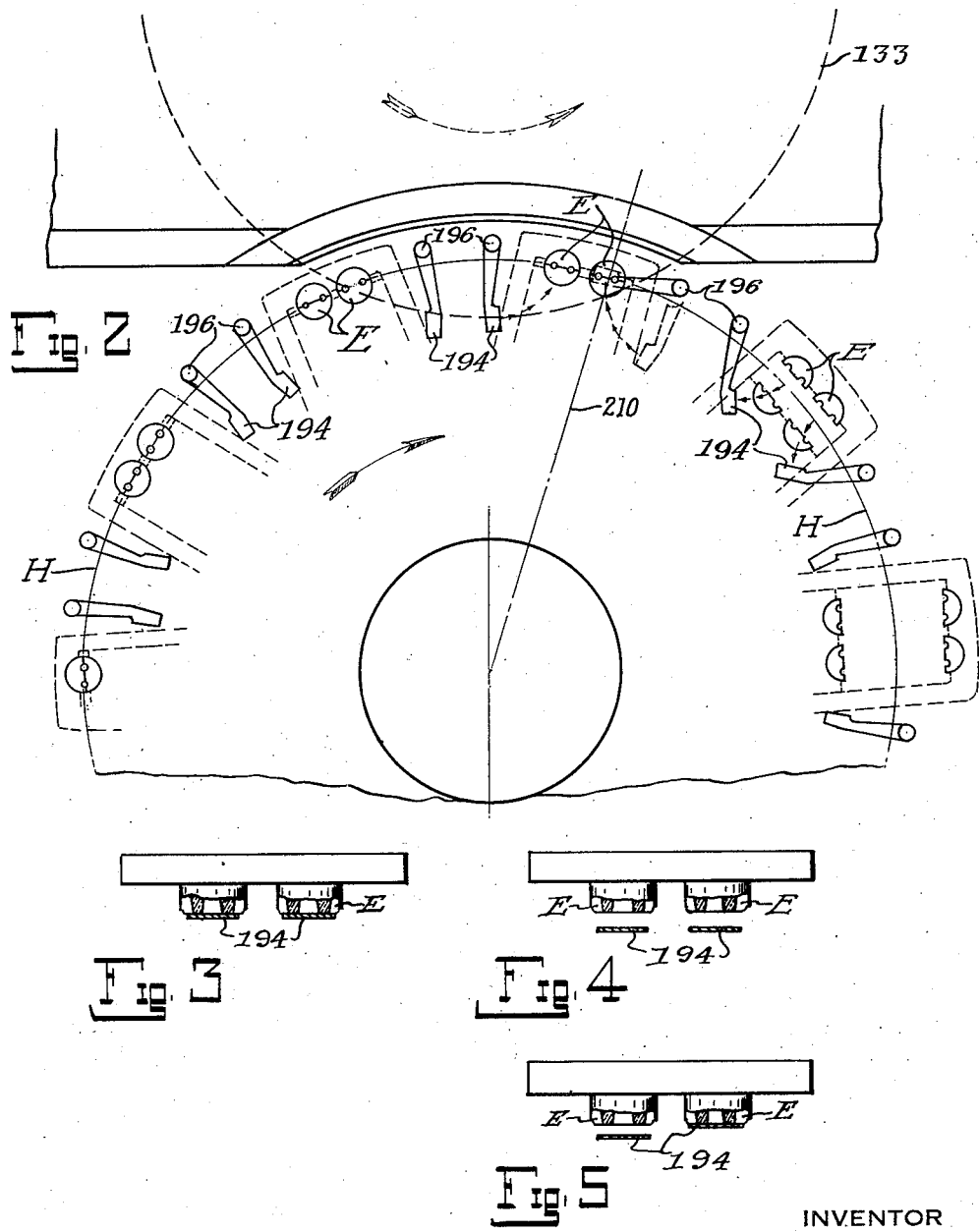

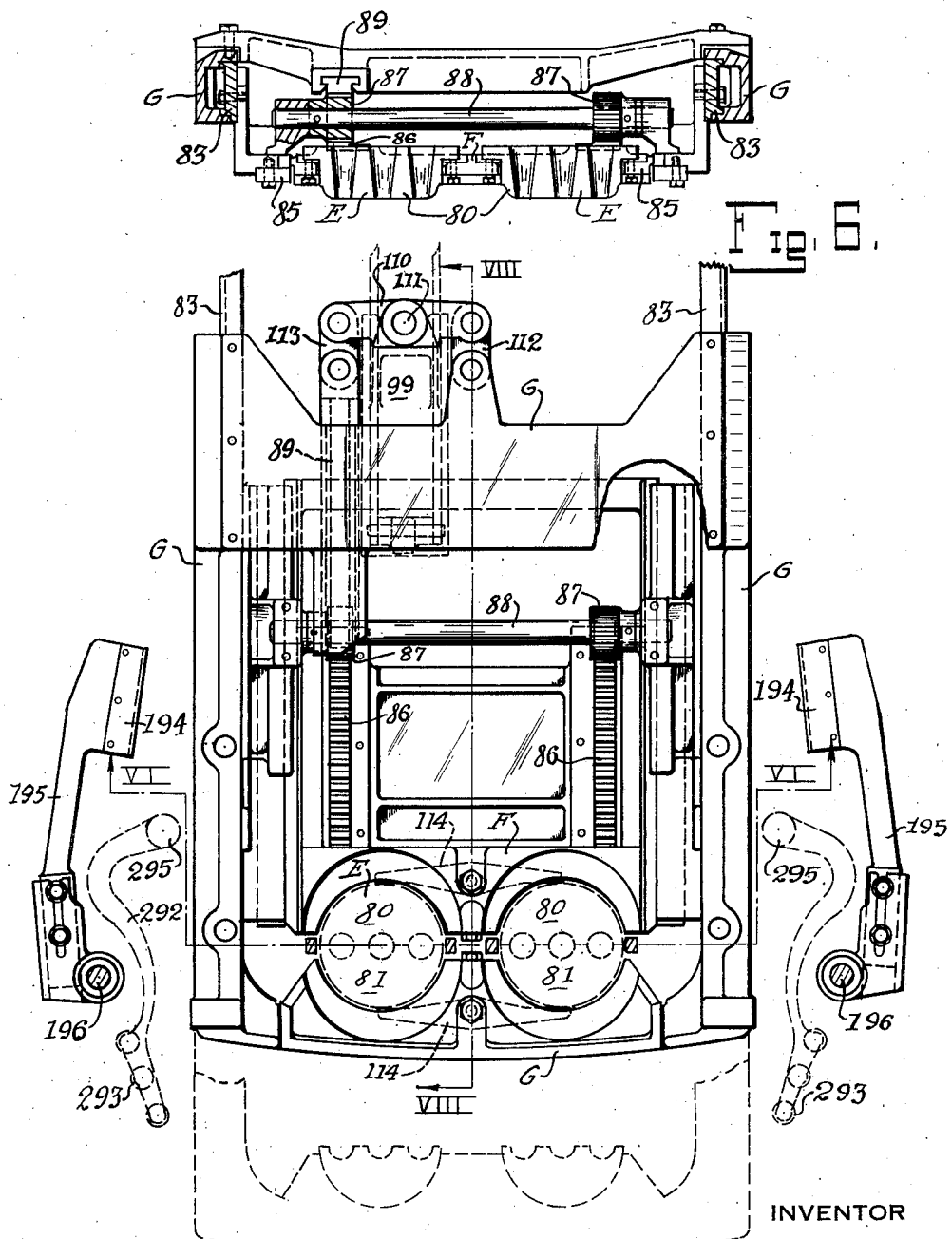

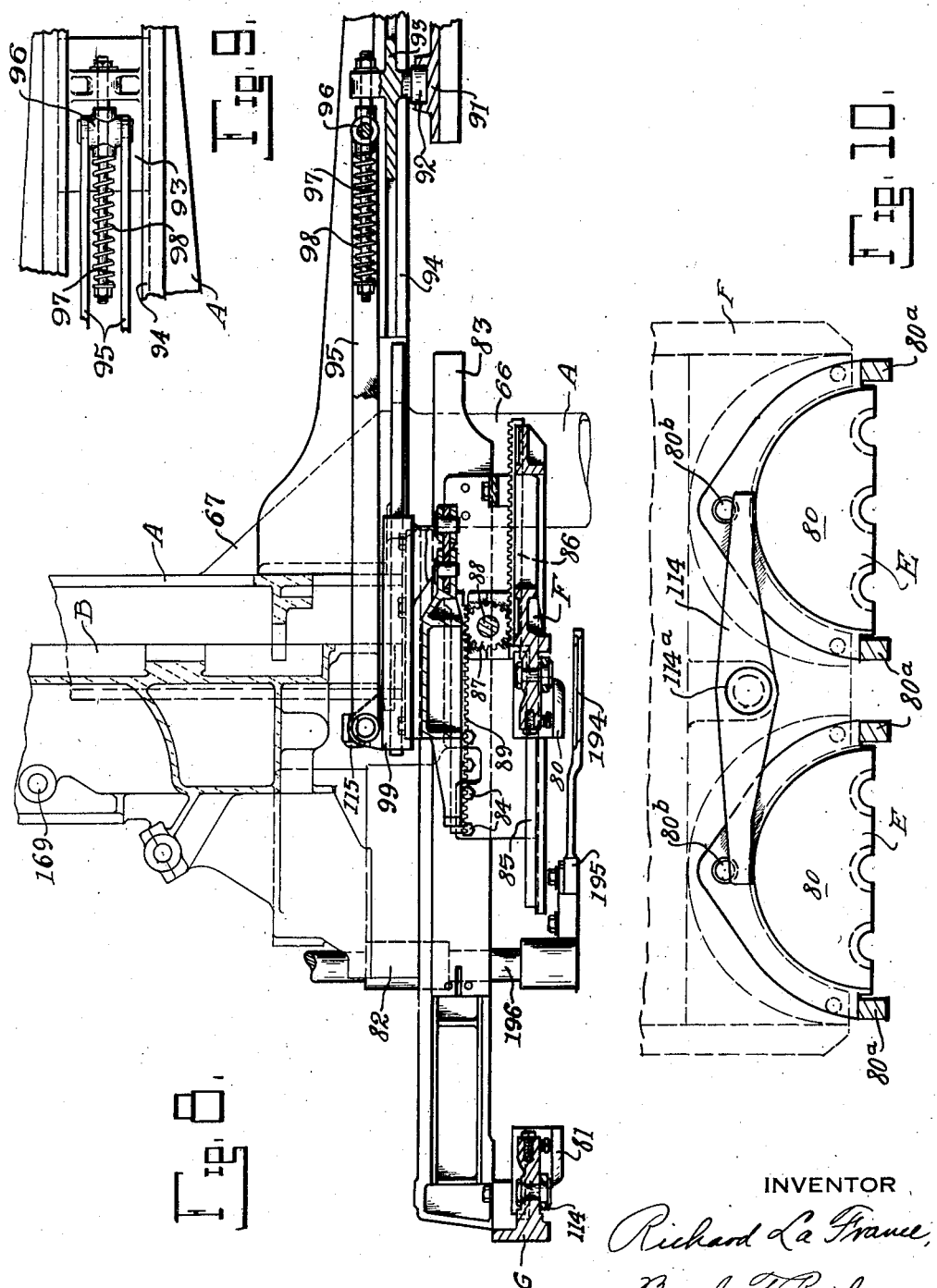

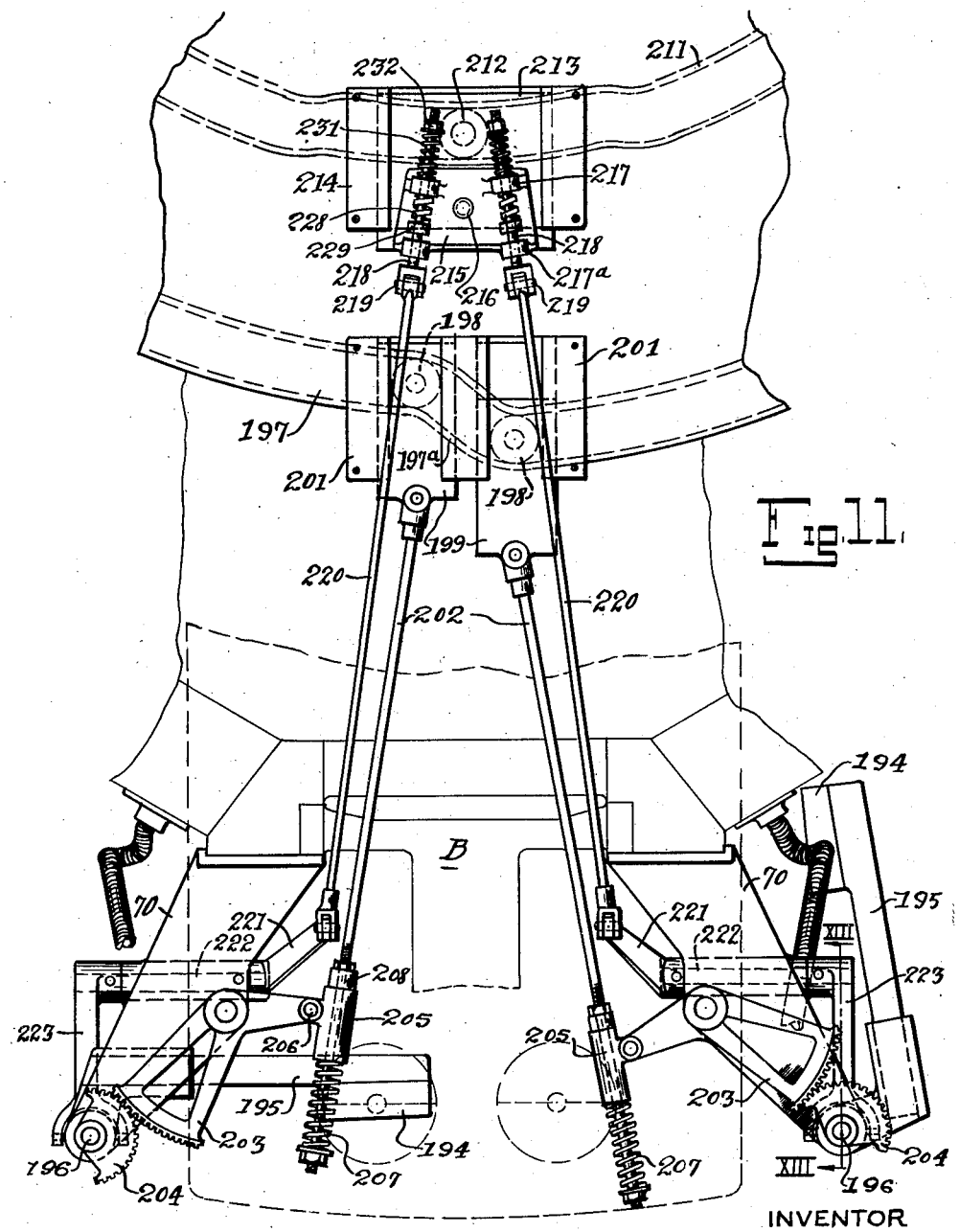

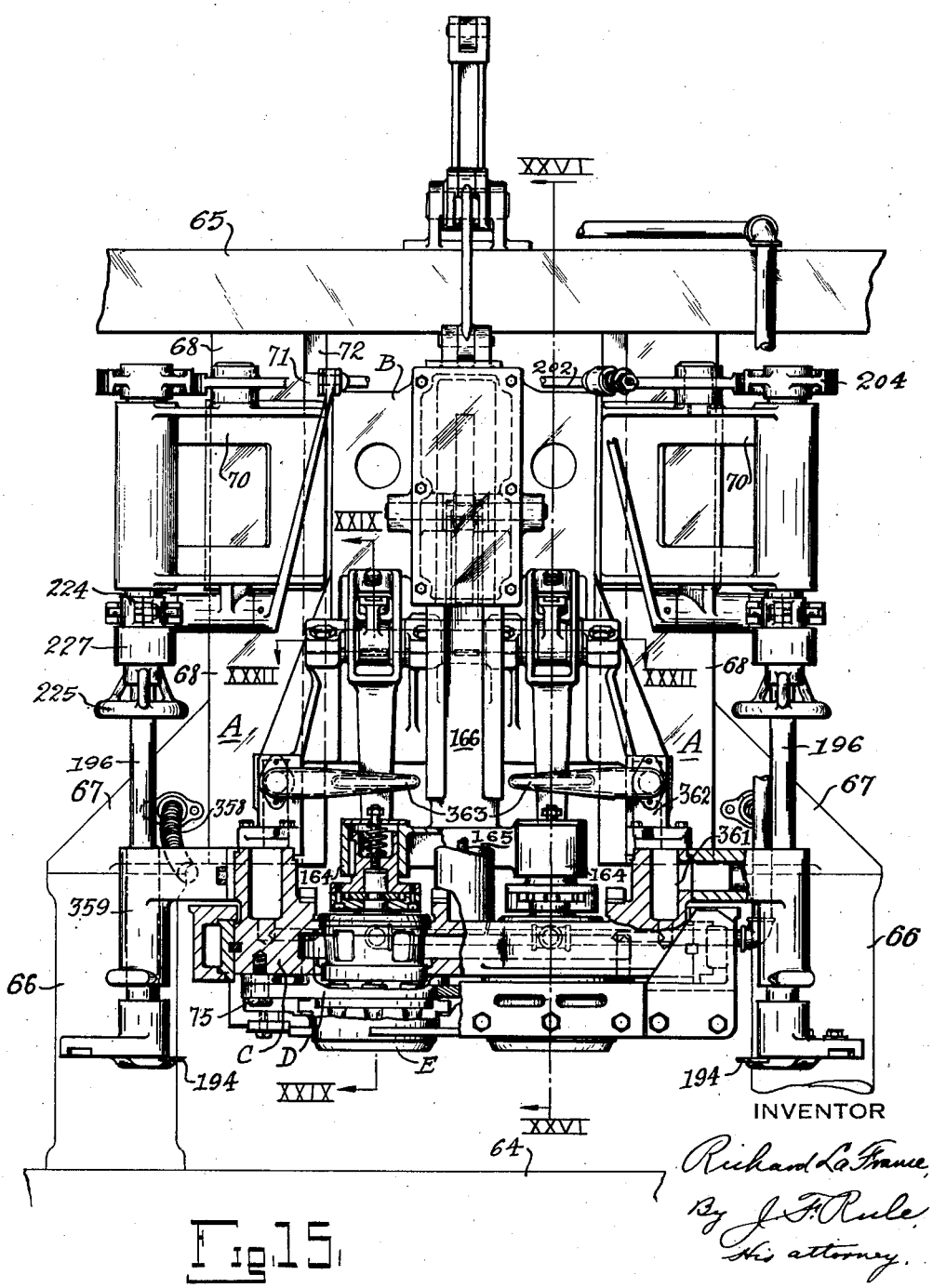

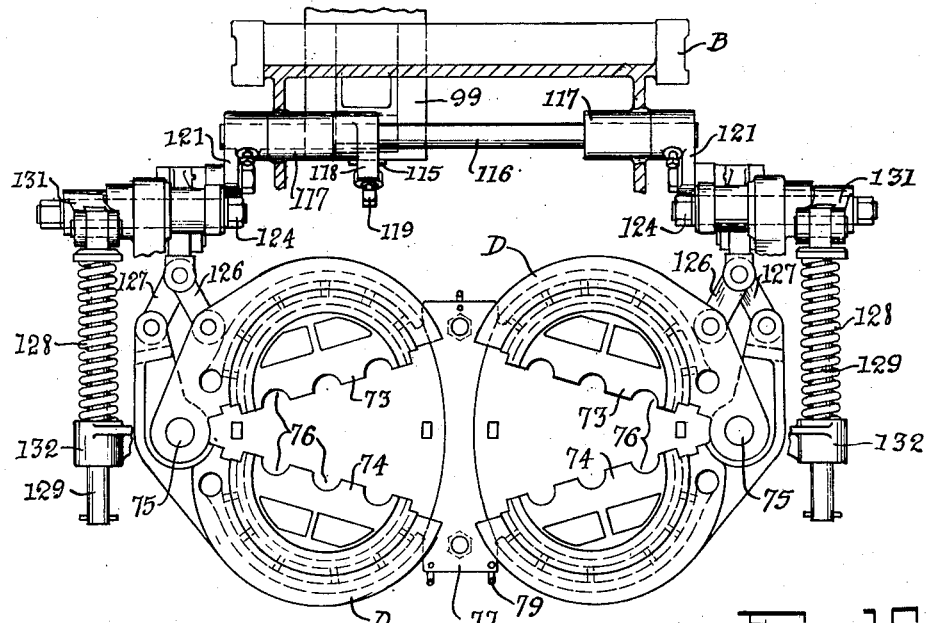
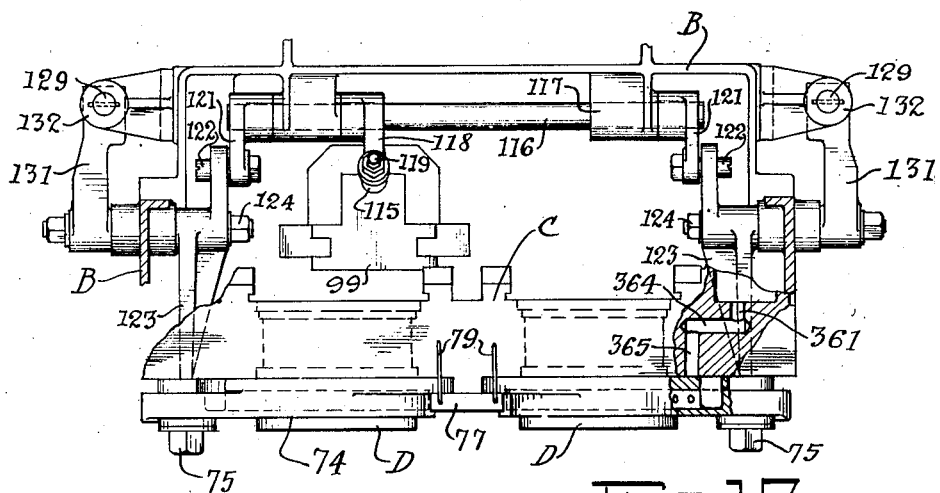

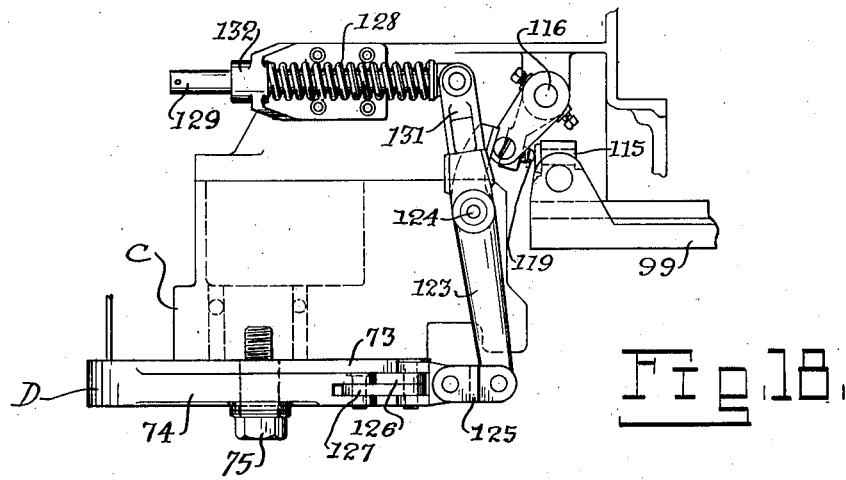
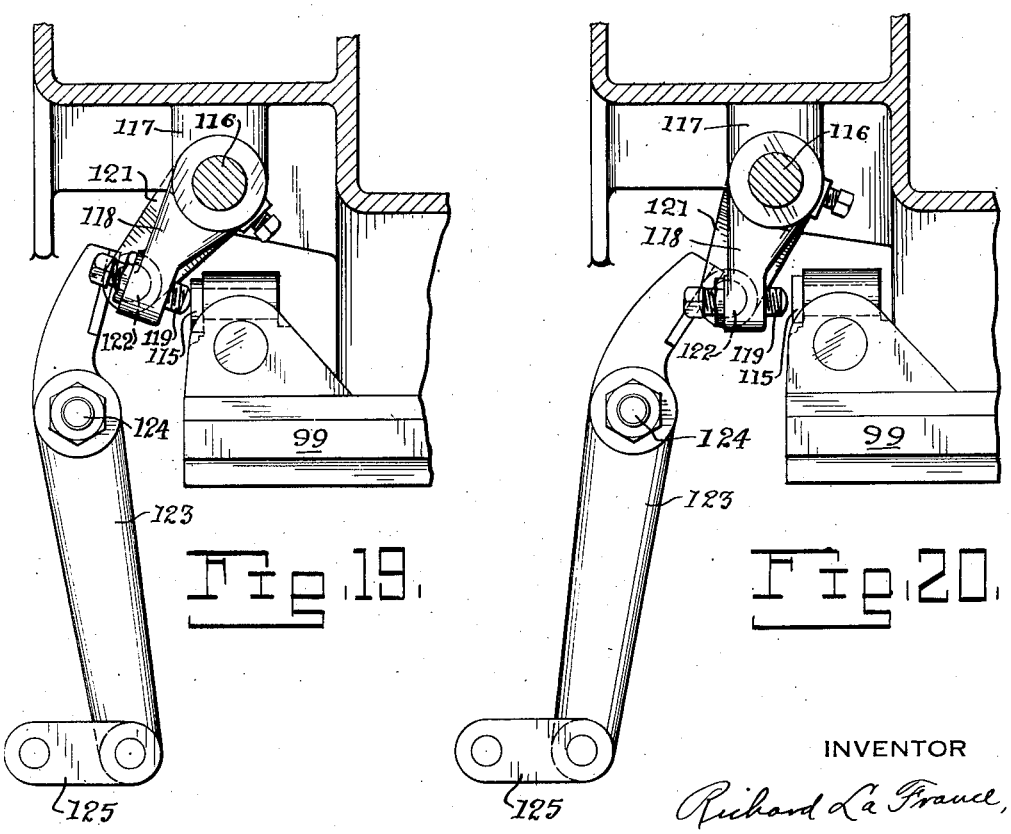

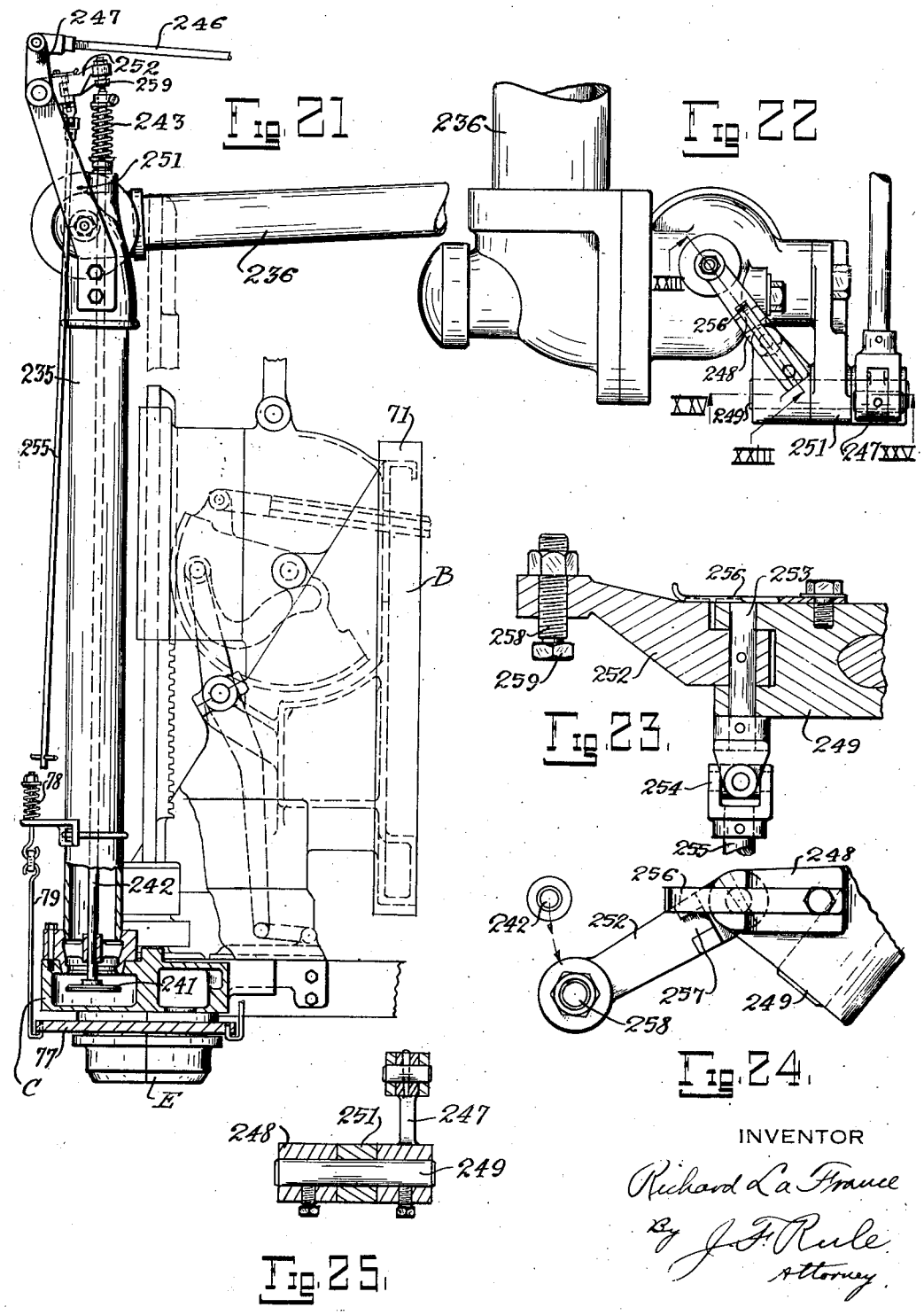

Sept. 6, 1927.
R. LA FRANCE
1,641,497
MACHINE FOR FORMING GLASS ARTICLES
Filed April 22, 1924   22 Sheets-Sheet 11
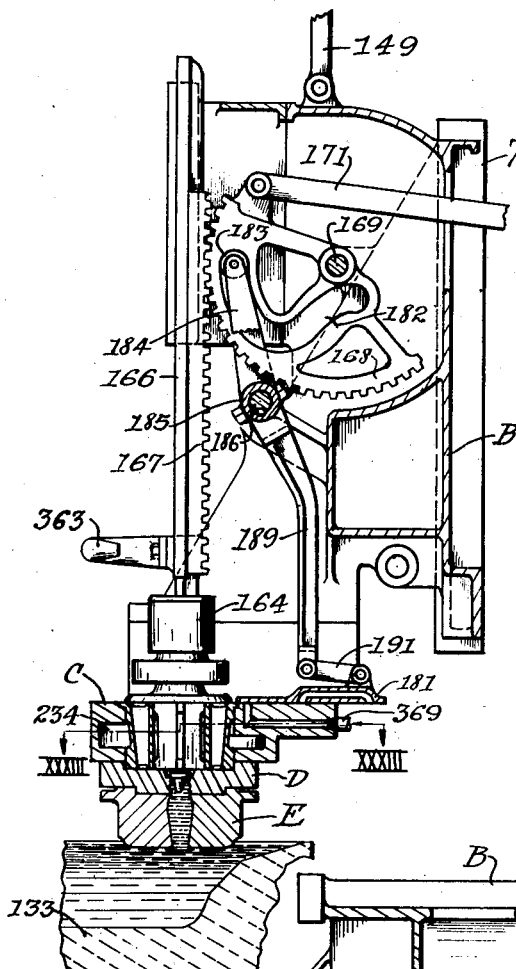
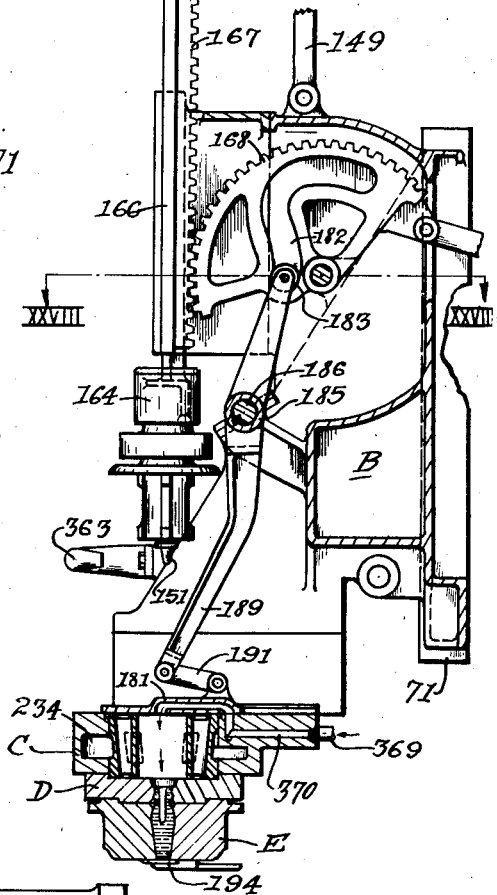
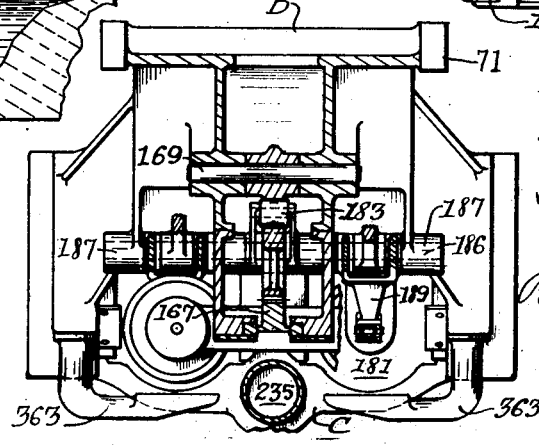
INVENTOR
Richard La France
By J. F. Rule
Attorney

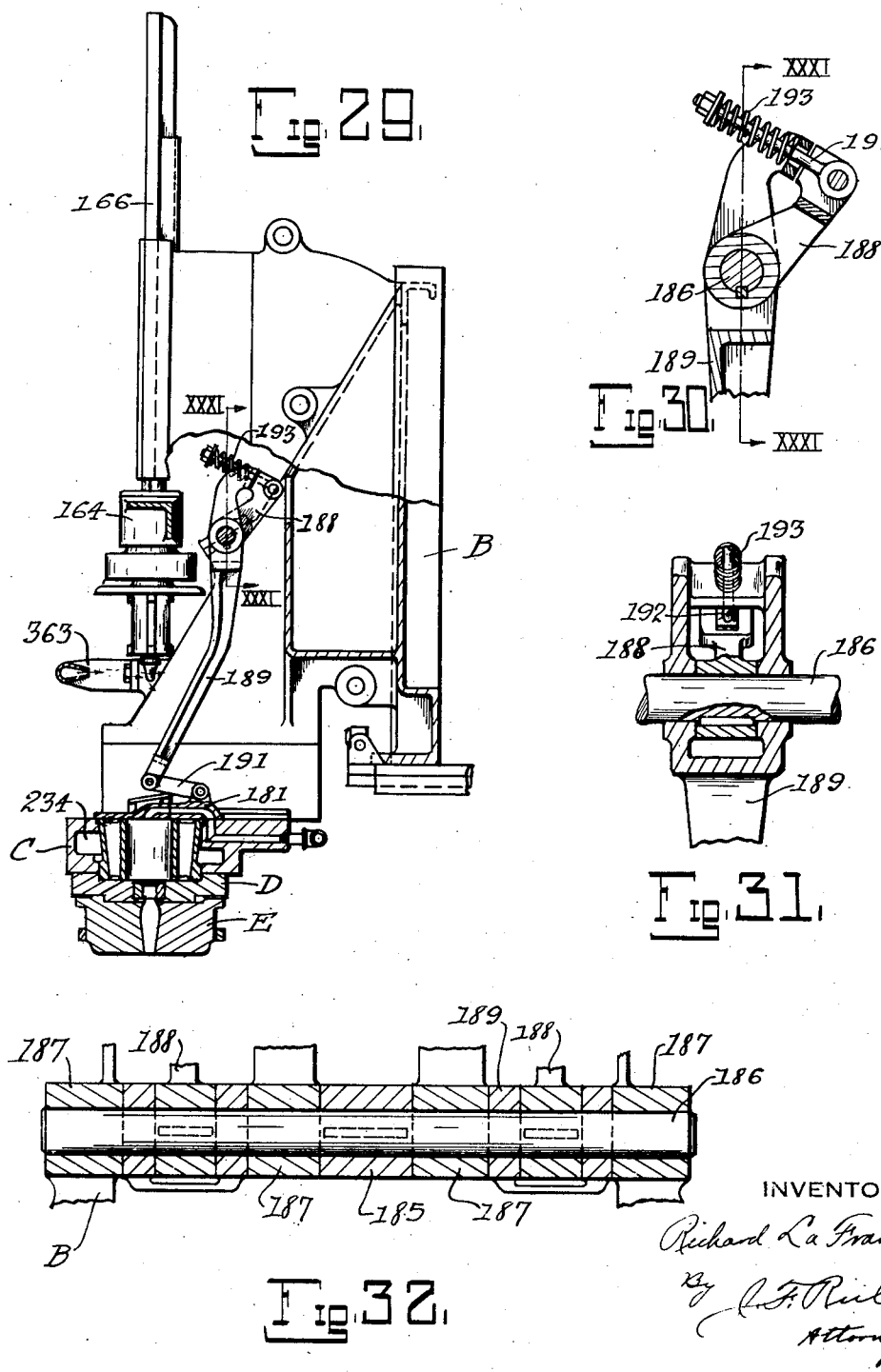

Sept. 6, 1927.  R. LA FRANCE  1,641,497

MACHINE FOR FORMING GLASS ARTICLES

Filed April 22, 1924  22 Sheets-Sheet 13

INVENTOR
Richard La France,
By J. F. Rule
Attorney.

Sept. 6, 1927.

R. LA FRANCE 1,641,497

MACHINE FOR FORMING GLASS ARTICLES

Filed April 22, 1924  22 Sheets-Sheet 14

INVENTOR
Richard La France,
By J. F. Rule
His attorney.

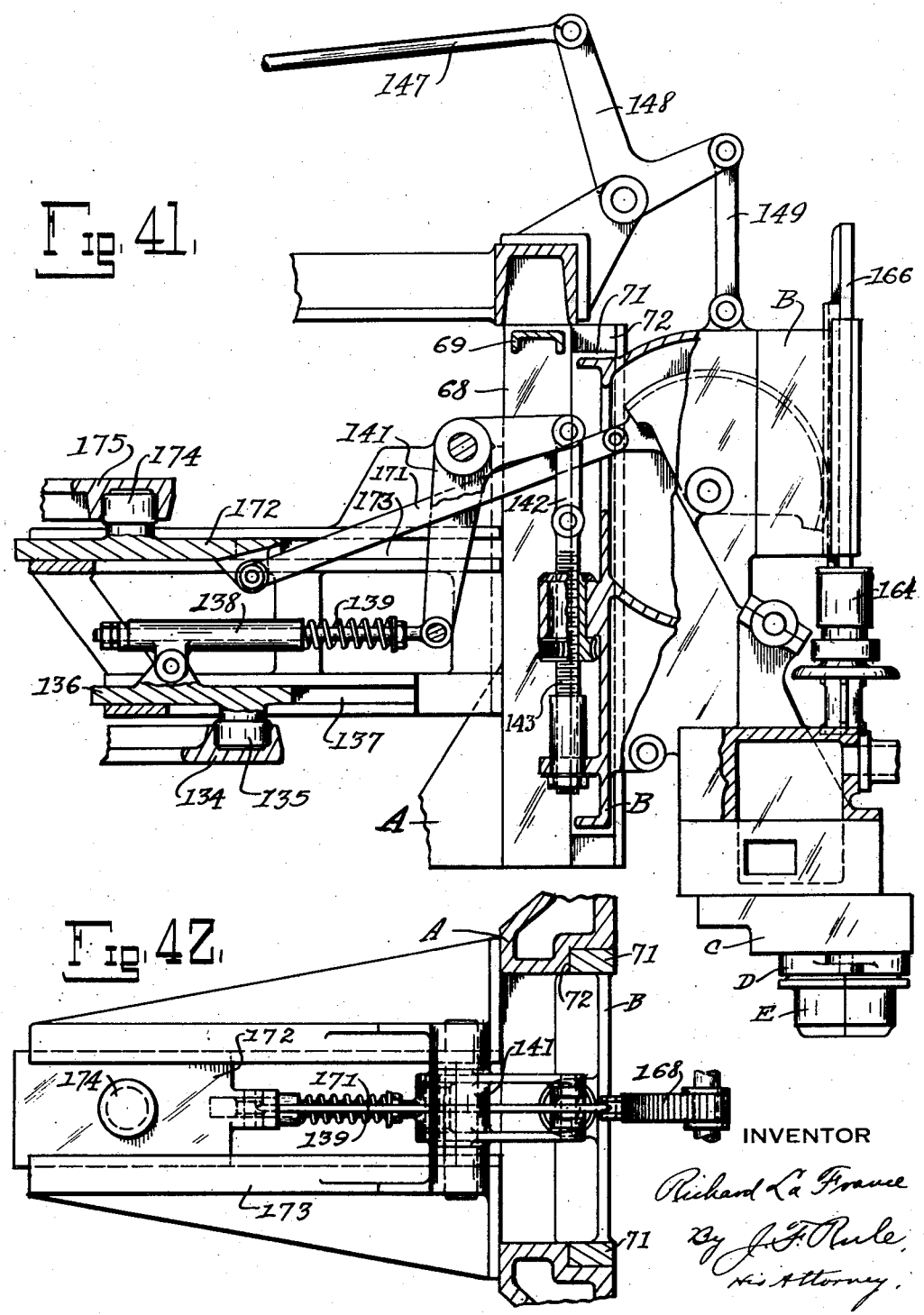

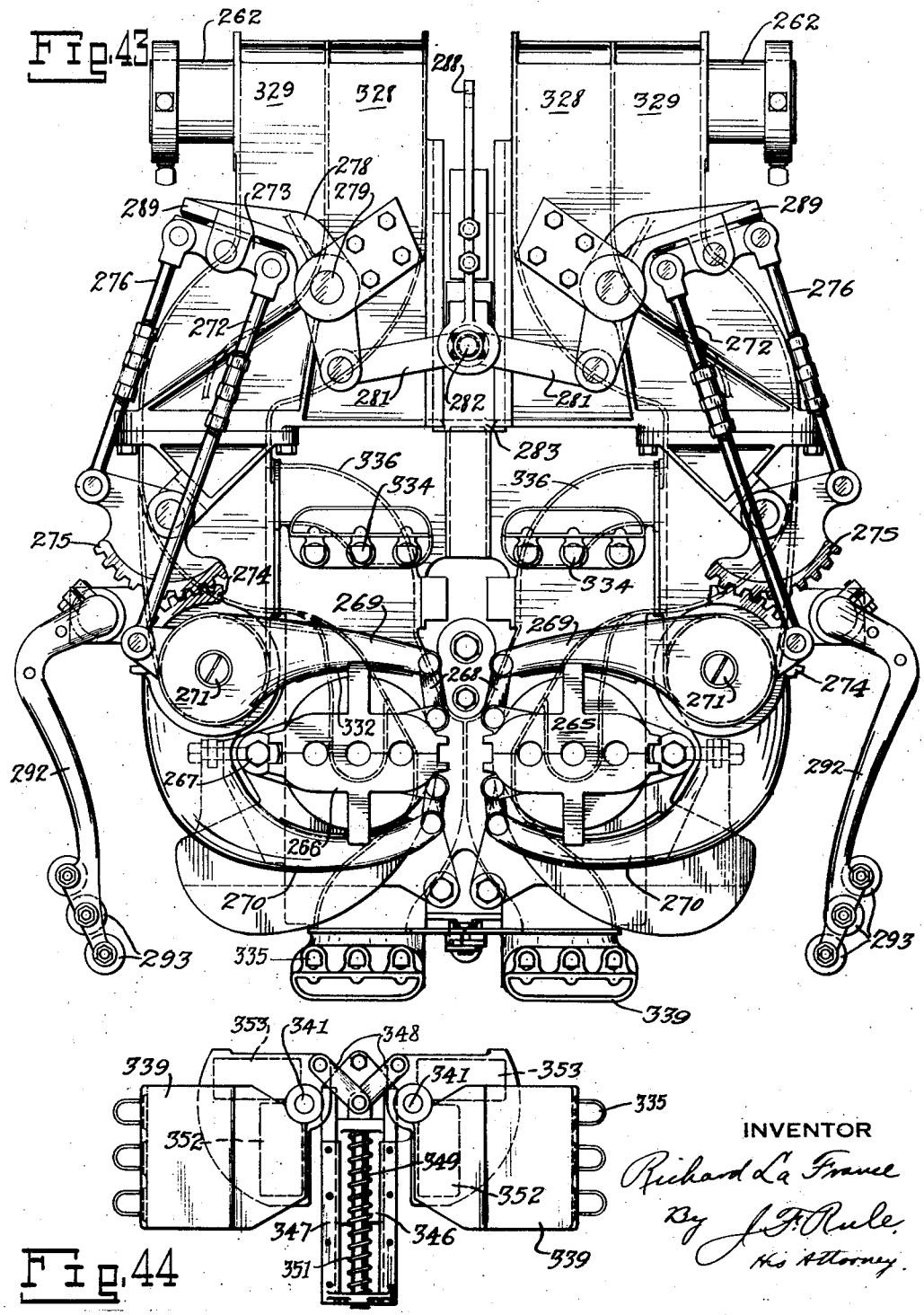

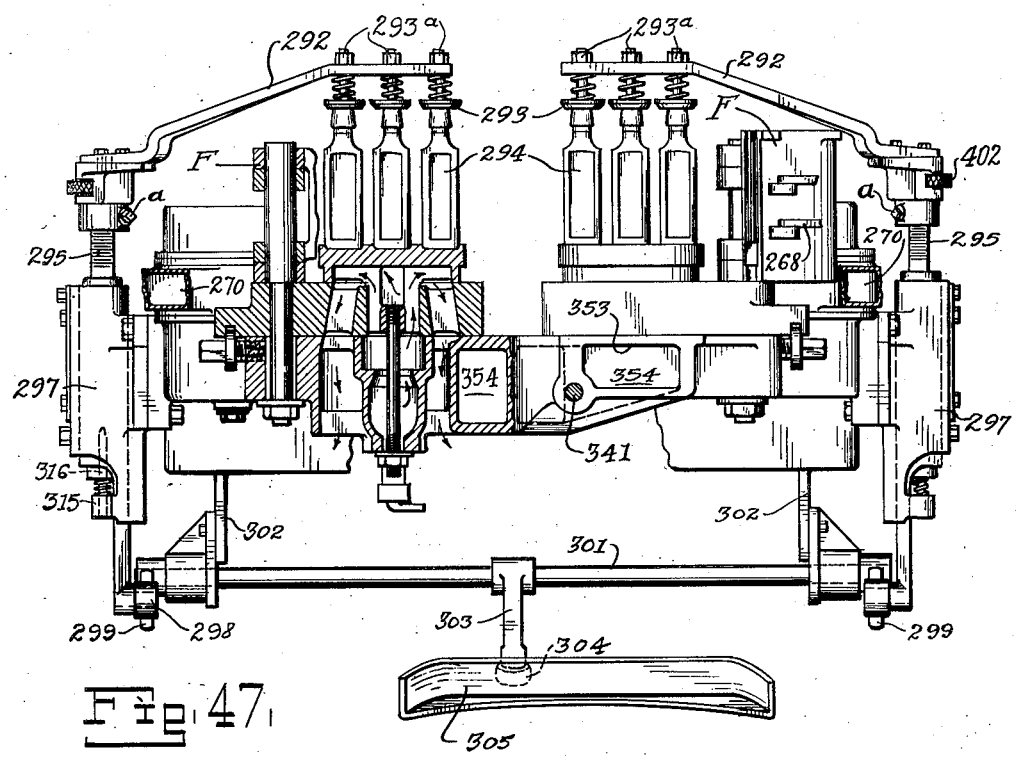
Fig. 47
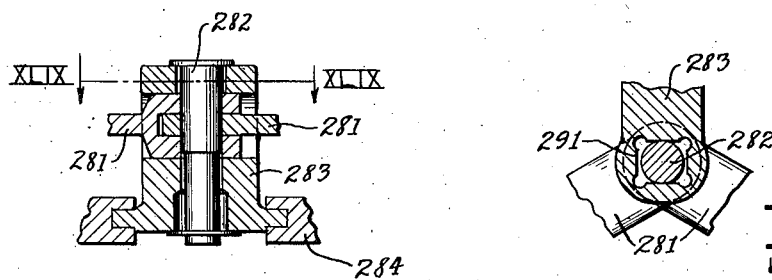
Fig. 48
Fig. 49
INVENTOR
Richard La France
By J. F. Rule,
His attorney.

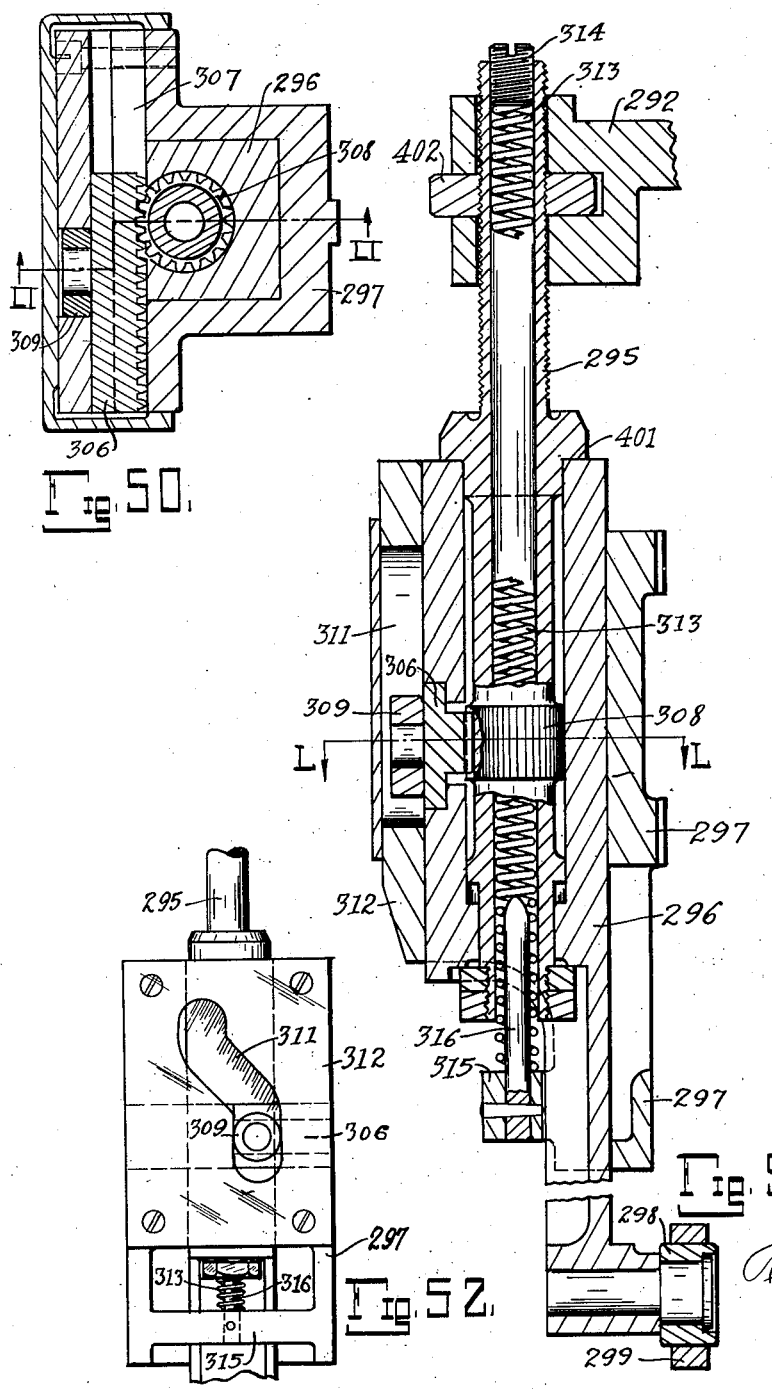

Sept. 6, 1927.  R. LA FRANCE  1,641,497
MACHINE FOR FORMING GLASS ARTICLES
Filed April 22, 1924   22 Sheets-Sheet 21
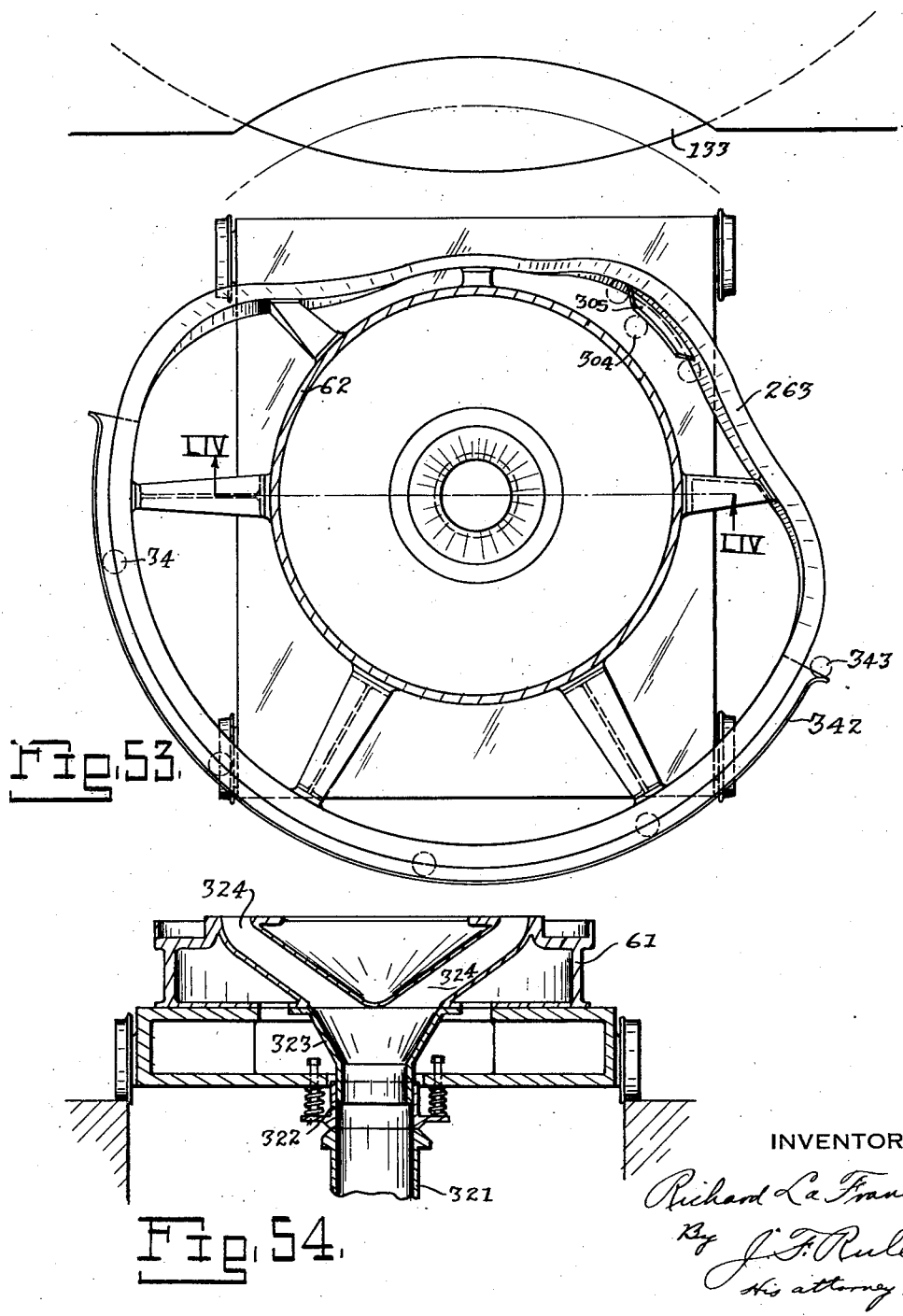
INVENTOR
Richard La France,
By J. F. Rule
His attorney.

Sept. 6, 1927.  R. LA FRANCE  1,641,497
MACHINE FOR FORMING GLASS ARTICLES
Filed April 22, 1924   22 Sheets-Sheet 22
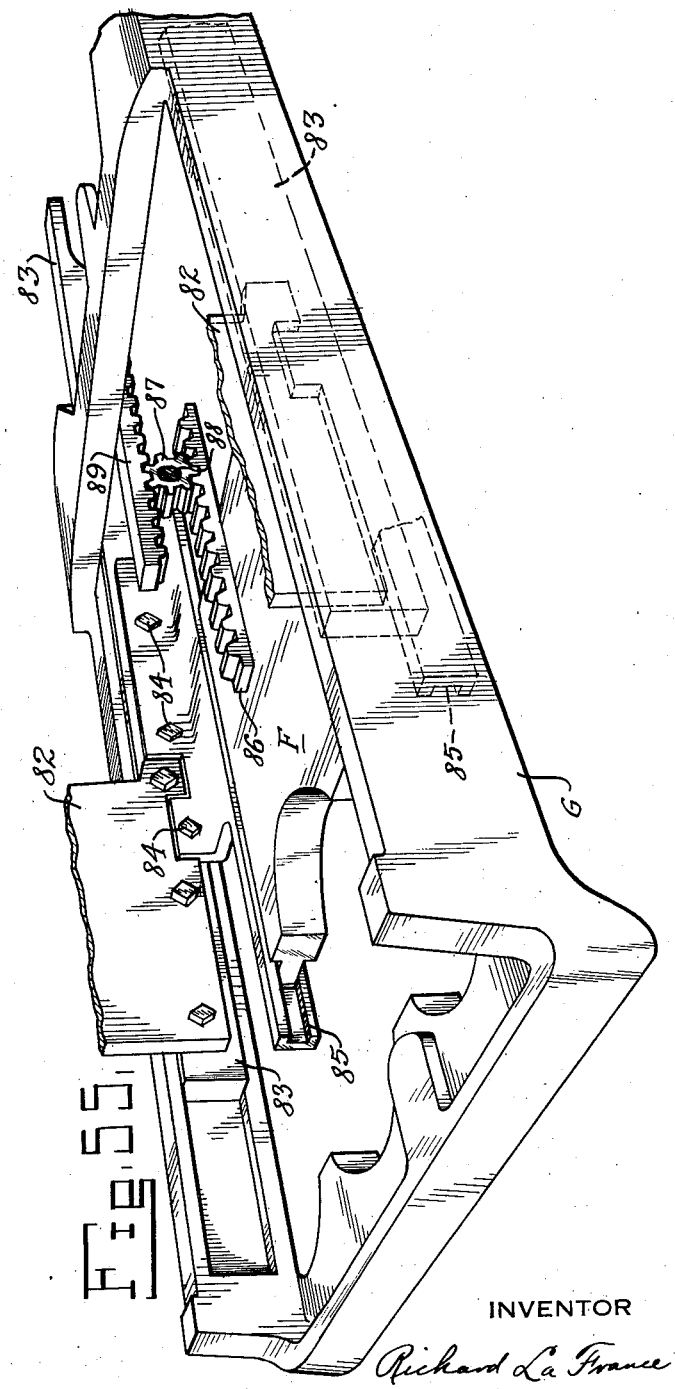
INVENTOR
Richard La France
By J. F. Rule
His attorney.

Patented Sept. 6, 1927.

1,641,497

UNITED STATES PATENT OFFICE.

RICHARD LA FRANCE, OF TOLEDO, OHIO, ASSIGNOR TO THE OWENS BOTTLE COMPANY, OF TOLEDO, OHIO, A CORPORATION OF OHIO.

MACHINE FOR FORMING GLASS ARTICLES.

Application filed April 22, 1924. Serial No. 708,172.

The present invention relates to machines for forming glass articles, and more particularly to machines of the Owens type in which blank molds on a continuously rotating carriage dip into a pool of molten glass and are filled by suction, the blanks being later transferred to finishing molds in which they are blown to finished form. In machines of this type, a series of heads or units are arranged at equal intervals around the mold carriage, each unit comprising a blank mold or molds into which the glass is drawn by suction, a cooperating finishing mold or molds, and mechanism for effecting the suction, blowing and various mechanical operations required in forming the articles.

In a great majority of machines of this type now in use, a single gathering mold is provided on each head or unit so that only one blank of glass is gathered at a time. In other machines, each mold is provided with a plurality of mold cavities, so that a number of blanks are gathered simultaneously.

An object of the present invention is to provide a glass blowing machine of much greater capacity and output than any machines heretofore in use. To this end there is provided on each head or unit, a plurality of gathering molds each comprising a plurality of mold cavities, so that a comparatively large number of blanks or mold charges are gathered by each head as it traverses the gathering tank.

A further object of the invention is to provide a practical and efficient machine of the character indicated, and in the attainment of this object I have provided various novel features of construction and operation, among which may be noted the following:

An improved cut-off mechanism comprising separate knives for the several molds on each head, said knives arranged to operate in succession in such manner that each severing operation takes place after the corresponding molds have moved beyond the gathering area from which the glass is drawn from the gathering tank. This arrangement prevents the chilled cut end of glass severed by one knife from falling back into the tank at a point where a succeeding mold gathers its charge. There is thus avoided the danger of the chilled glass or air bubbles being drawn into the molds.

A further feature consists in providing mechanism by which all of the bottles of each head are discharged simultaneously, thereby overcoming the difficulty which has heretofore been experienced of dropping the bottles without having them strike each other. This provision also materially simplifies the operating adjustments.

Another feature of novelty relates to cooling nozzles for the molds, so arranged that they are automatically withdrawn to permit the discharge of the finished articles. There is also provided means for automatically cutting off the supply of cooling air while the nozzles are withdrawn, thereby effecting a considerable economy in the amount of cooling air used.

Various novel pressure equalizing mechanisms are used in connection with the blank molds, finishing molds, neck molds and plungers as hereinafter set forth.

Other features of novelty will appear hereinafter.

The present application discloses various novel features also disclosed in Patent Number 1,547,439, granted Michael J. Owens, July 28, 1925.

In the accompanying drawings, which illustrate a bottle blowing machine constructed in accordance with the principles of my invention.

Figures 2 is a diagrammatic view showing the blank molds and cut-off knives, and indicating particularly the points at which the knives operate.

Figure 3 is a diagrammatic view illustrating the knives in cutting position.

Figure 4 is a similar view showing the knives dropped away from the molds.

Figure 5 is a similar view indicating the successive dropping of the knives away from the molds.

Figure 6 is a sectional elevation at the line VI—VI on Figure 7, showing the blank molds.

Figure 7 is a plan view showing a blank mold carrying frame, the blank molds, their operating mechanism and the knives.

Figure 8 is a sectional elevation at the line VIII—VIII on Figure 7, but with the blank molds in open position.

Figure 9 is a detail plan view showing connecting means between the blank mold carrying frame and its cam.

Figure 10 is a bottom plan view of a pair of blank mold sections and equalizing mechanism.

Figure 11 is a plan view showing particularly the cutters and their operating mechanism.

Figure 15 is a front elevation showing a blank mold dipping head and associated mechanism.

Figure 16 is a plan view of the neck molds and their operating mechanism.

Figure 17 is a front elevation of the same.

Figure 18 is an end elevation of the same.

Figure 19 is a view on a larger scale showing mechanism for opening the neck molds, the parts being in the position assumed when the neck molds are opened.

Figure 20 is a similar view with the parts in the position assumed when the neck molds are closed.

Figure 21 is a part sectional elevation showing the vacuum line, the vacuum controlling valve and its operating mechanism.

Figure 22 is a top plan view of the same.

Figure 23 is a section at the line XXIII—XXIII on Figure 22.

Figure 24 is a plan of a vacuum cut-out arm shown in Figure 22, but thrown out of position for operating the vacuum valve.

Figure 25 is a section at the line XXV—XXV on Figure 22.

Figure 26 is a section at the line XXVI—XXVI on Figure 15.

Figure 27 is a similar view, but with the mold lifted, the knife in position against the bottom of the mold, the plunger withdrawn, and the blowing head valve in operative position.

Figure 28 is a section at the line XXVIII—XXVIII on Figure 27.

Figure 29 is a section at the line XXIX—XXIX on Figure 15.

Figure 30 is a sectional, detail view on a larger scale of parts shown in Figure 29.

Figure 31 is a section at the lines XXXI—XXXI on Figures 29 and 30.

Figure 32 is a section at the line XXXII—XXXII on Figure 15.

Figure 41 is a part sectional elevation showing the dipping head or frame which carries the blank molds, mechanism for lifting and lowering said frame and plunger operating mechanism.

Figure 42 is a part sectional plan view of parts shown in Figure 41.

Figure 43 is a plan view of the finishing mold frame and parts carried thereby.

Figure 44 is a front elevation of cooling nozzles for the blank molds.

Figure 47 is a part sectional elevation at the line XLVII—XLVII on Figure 45.

Figure 48 is a section at the line XLVIII—XLVIII on Figure 45.

Figure 49 is a section at the line XLIX—XLIX on Figure 48.

Figure 50 is a section at the line L—L on Figure 51.

Figure 51 is a section at the line LI—LI on Figure 50, and shows the mechanism for operating the "knock-out" arm.

Figure 52 is a front elevation of the cam controlling the rotative movement of the "knock-out" arm.

Figure 53 is a sectional plan view showing the cam track for the finishing mold frames, the cam for operating the "knock-out" arms and the cam controlling the cooling nozzles for the blank molds.

Figure 54 is a section at the line LIV—LIV on Figure 53, showing the manner in which air is supplied through the base of the machine.

Figure 55 is a perspective view of a blank mold carrying frame.

The mechanism controlling ejection of ware from the forming machine and illustrated in Figs. 45 to 51, comprises the subject matter of a divisional application, Serial Number 136,979, filed September 22, 1926.

The mechanism for cooling the molds illustrated in Figs. 1, 44, 45, 46, 53 and 54, comprises the subject matter of a divisional application, Serial Number 142,166, filed October 18, 1926.

The mechanism for opening and closing the molds illustrated in Figs. 1, 6, 7, 8, 10, 43, 45, 48, 49 and 55 constitutes the subject matter of a divisional application, Serial Number 145,140, filed October 30, 1926.

Figure 1:
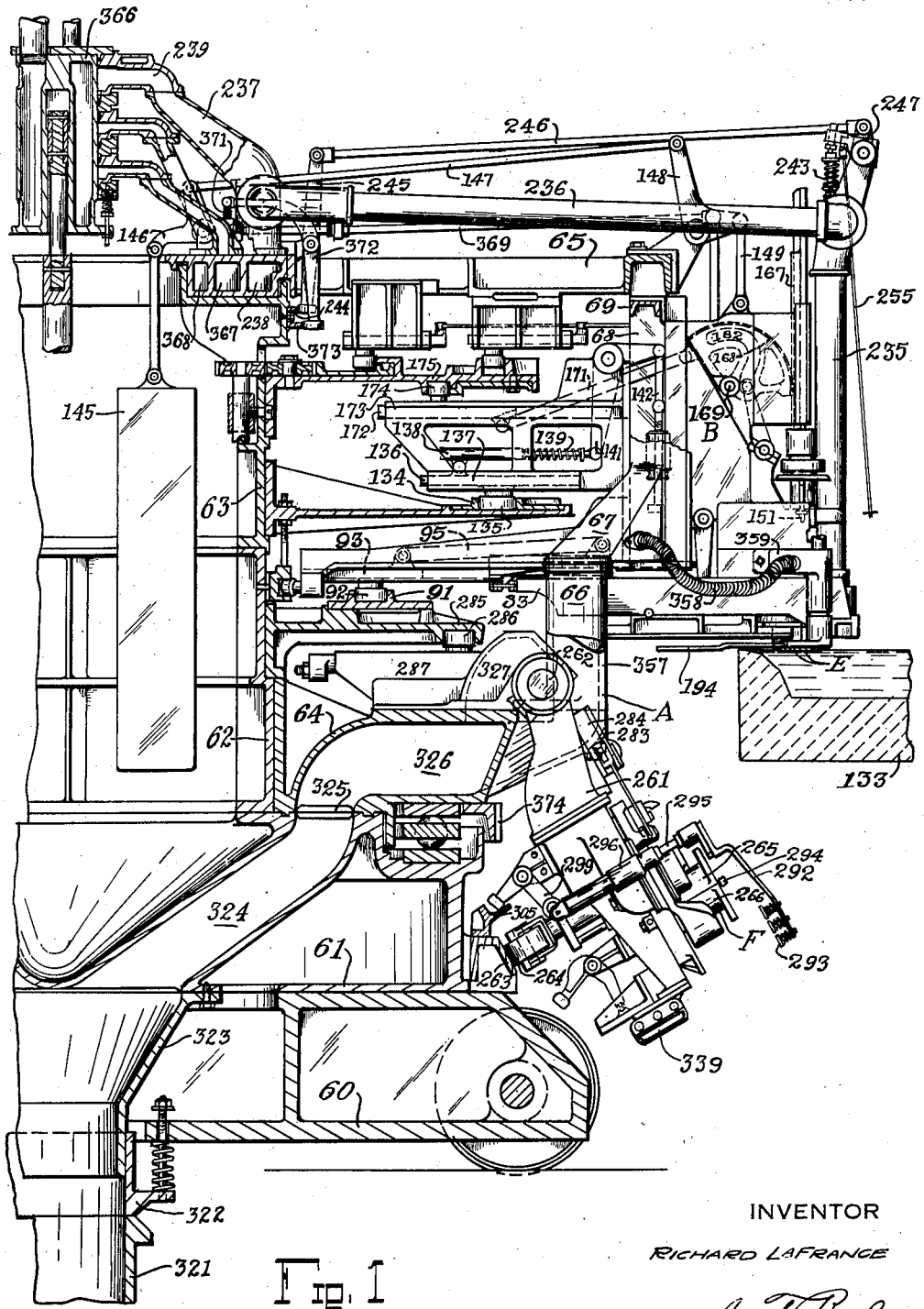
Figure 1 is a sectional elevation of the machine, parts being broken away.

*General construction.*—Referring particularly to Figure 1, the machine comprises a base 60 on which is mounted a casting 61 supporting the mold carriage which rotates continuously about a central stationary column comprising sections 62 and 63. Stationary cams for actuating various parts of the machine are mounted on said column. The mold carriage comprises a lower frame portion 64 and an upper frame portion 65, united by the frames which support the individual heads or units arranged at equal intervals around the carriage. Each of said units includes blank molds, finishing molds and mechanism for actuating the molds and for effecting the various operations on the glass. Each unit is supported by a frame-work A (see Figs. 1, 12 and 15) on the mold carriage, said frame-work including standards 66 rising from the frame member 64, upwardly and inwardly inclined frame members 67 and vertical portions 68. The frame A also includes a cross piece 69, and forwardly extending members 70. Mounted to reciprocate vertically in the frame A is a frame B including vertical slide bars 71 (Figs. 15, 26, 27, 28, 41, 42) slidable in guideways 72 in the frame A. Bolted to the lower end of the frame B is a blowing head C which carries the neck molds D.

*Blank mold operating mechanism.*—The blank molds E comprise sections 80 and 81 carried respectively on frame members F and G (see Figs. 6 to 10 and 55) supported on the frame B so that the blank molds are carried up and down with the frame B. The frames F and G are mounted for horizontal reciprocation to move the blank mold sections from their separated position (Fig. 8) to the closed position shown in full lines in Figure 7. Referring to Figure 55, the plates 82 forming part of the frame B are bolted to rails 83 on which the frame G is slidable horizontally. Connected to the rails 83 by bolts 84 are inner rails or tracks 85 on which the frame F is mounted to slide horizontally. The frame F has fixed thereto rack bars 86 driven by pinions 87 on a shaft 88 journalled in the sides of the frame B. The frame G supports a rack bar 89 running in mesh with one of the pinions 87.

The movement of the frames F and G for opening and closing the blank molds is controlled by a cam 91 (Figs. 1 and 8) on which runs a roll 92 on a slide block 93 mounted to slide in guideways 94 on the frame A. The slide block 93 is connected through a pair of rods or links 95 to a slide block 99 mounted to reciprocate on the frame G. The connection between the links 95 and block 93 (see Figs. 9 and 10) comprises a head 96 pivoted to said links and slidable on a rod 97 attached to the slide block 93. A coil spring 98 interposed between said head and the end of the rod provides a yieldable connection which prevents excessive strain or breakage of parts if any obstruction prevents the mold frames from moving freely under the influence of the cam. The connection between the slide block 99 and the frame G (see Figs. 7 and 8) comprises an equalizing lever 110 connected at its center to the block 99 by a pivot pin 111. The lever 110 is connected at one end through a link 112 to the frame G and at its opposite end is connected through a link 113 to the rack bar 89.

The stationary cam 91 is shaped to effect the opening and closing movements of the molds E at the required times as the carriage rotates. As said cam moves the roll 92 inward or toward the center of the machine, the frame G and rack bar 89 are drawn inward through the connections just described, thereby moving the blank mold sections 81 inward. The inward movement of the rack bar 89 operates through the pinion 87 and rack 86 to move the frame F and blank mold sections 80 thereon outward to meet the inwardly moving sections 81, thereby closing the blank molds. The inward movement of the frame G may be arrested and the position of the mold sections 81 determined by the frame G striking the end of the guide rails 83 (Fig. 55). The equalizing lever 110 permits the blank molds to be fully closed and centered. Thus, if the frame G is brought to its stop position before the blank molds are fully closed, the lever 110 will be moved about its point of connection with the frame G as a fulcrum, thereby causing a continued movement of the rack bar 89, pinion 87 and rack bar 86 to complete the movement of the frame member F and thereby completely close the molds. In a similar manner the equalizing lever operates to center and close the molds if the frame member F should be brought to its stop position before the molds are fully closed.

Equalizing levers 114 (Figs. 7 and 10) are connected by pivots 114$^a$ to the frames F and G. Each lever bears at its ends against a pair of mold sections 80 or 81. If, during the mold-closing movement of the frame F, for example, one of the mold sections 80 is arrested by its centering pins 80$^a$ before the other section, the final movement is transmitted through the lever 114 to bring the other mold section to its closed position and equalize the pressure on the two mold sections. The mold sections have sufficient play on their supporting pins 80$^b$ to permit this centering movement and equalization of pressure.

*Neck molds and their operating mechanism.*—As shown in Figures 16 and 17, there are a plurality of neck molds on each head or unit, each mold comprising sections 73 and 74 connected by a pivot pin 75 to the head C. Each of the neck mold sections is provided with a plurality of mold cavities 76. As shown, there are three such mold cavities in each section, but a greater or less number may obviously be provided. The free ends of the neck mold sections are supported by a plate 77 to which an upward tension is applied by means of springs 78 (Fig. 21) operating through rods 79 attached to said plate.

The mechanism for opening and closing the neck molds will be understood by reference to Figures 8 and 16 to 20 inclusive. The slide block 99 carries a pin 115 which, during the final portion of the opening movement of the blank molds, operates through the following mechanism to open the neck molds: A rock shaft 116 is journalled in bearings 117 in the frame B and has keyed thereto a depending rock arm 118 which carries an adjustable stop pin 119 in the path of the pin 115. The rock shaft 116 also carries at its ends, depending rock arms 121 in which are mounted outwardly projecting lugs 122. Vertically disposed levers 123 are secured to rock shafts 124 journalled in the frame B. The upper arms of the levers 123 project into the path of the lugs 122. The lower arms of said levers have link connections 125 with links 126 and 127 connected respectively to the neck mold arms which carry the sections 73 and 74 of the neck molds.

As the slide block 99 is completing its outward or blank closing movement, the pin 115 engages the pin 119 and thereby rocks the shaft 116, causing the rock arms 121 thereon to actuate the levers 123 and open the neck molds. The neck molds are closed during the initial portion of the closing movement of the blank molds by means of coil springs 128 mounted on rods 129 pivoted to rock arms 131 on the rock shafts 124. The rods 129 slide in bearing blocks 132 and the springs 128 are held under compression between said blocks and the arms 131 and hold the neck molds closed under spring pressure.

*Lifting and lowering of the blank molds.*— The frame B which carries the blank molds E is lowered to dip the molds into the molten glass in a tank 133 (Figs. 1 and 26) for gathering charges by suction as the molds travel over the tank. The lowering and lifting of the molds is effected by a stationary cam 134 (Figs. 1 and 41). A cam roll 135 running on the cam 134 is carried by a slide block 136 mounted to reciprocate radially of the machine in guides 137 on the frame A. Pivotally connected to the block 136 is a rod 138 comprising telescoping sections normally held extended by a spring 139. Said rod is connected to one arm of a bell crank lever 141 pivoted to the frame A. The other arm of the bell crank is connected through a link 142 to a rod 143 having an adjustable connection with the frame B. Each frame B is counterbalanced by a counterweight 145 (Fig. 1) connected through a bell crank lever 146, link 147, bell crank lever 148 and link 149 to the frame B.

Figures 35, 36:
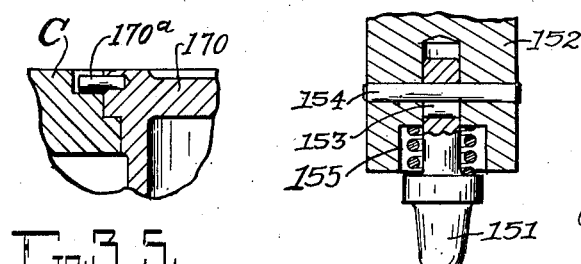
Figure 35 is a section at the line XXXV—XXXV on Figure 33.
Figure 36 is a section at the line XXXVI—XXXVI on Figure 34.

*Plunger mechanism.*—The mechanism for operating the plunger tips or cores which form the initial blow openings in the charges of glass in the molds will be understood by reference to Figures 1, 15 and 33 to 42 inclusive. The plunger tips 151 are mounted in heads 152, the number of tips in each head being equal to the number of mold cavities in the corresponding blank mold. Referring to Figure 36 which shows the mounting of a plunger tip, the stem of the tip is provided with a slot 153 through which extends a pin 154 by which the tip is locked in the head 152. A coil spring 155 holds the tip 151 with a yielding pressure, permitting said tip to yield in an upward direction under any abnormal strain.

Each of the heads 152 is formed with a stem 156 projecting upwardly into a socket formed in a chuck 157. Said head is held in the chuck by a pair of gripping levers 158 pivoted at 159 on the chuck. The inner ends of said levers engage a groove 161 in the stem 156 and are held in such position by springs 162. The outer ends of the levers 158 may be gripped by hand to release the head 152 for removal from the machine. The head 152 is held against rotation in the chuck by a key 163. The chucks 157 are supported in cylindrical bearings 164 forming the ends of a cross head or arm 165 on the lower end of a vertical plunger bar 166 (Fig. 15).

The plunger is formed with a rack 167 (Figs. 26, 27) operated by a gear segment 168 pivoted at 169 on the frame B. A link 171 connects the gear segment (see Figs. 1, 41 and 42) with a slide block 172 mounted to slide radially of the machine in guides 173 on the frame A. The block 172 carries a cam roll 174 running on a stationary cam 175. Said cam operates through the connections just described to move the plunger downward, projecting the heads 152 downward through adapters 170 removably mounted in the blow head frame. The tips 151 are thereby projected into the neck molds in position to form the initial blow openings in the glass when the latter is drawn into the molds. The adapters 170 are shaped to correspond with the plunger heads 152 and are held against rotative movement in the head C by pins 170ª (Fig. 35).

Figure 37:
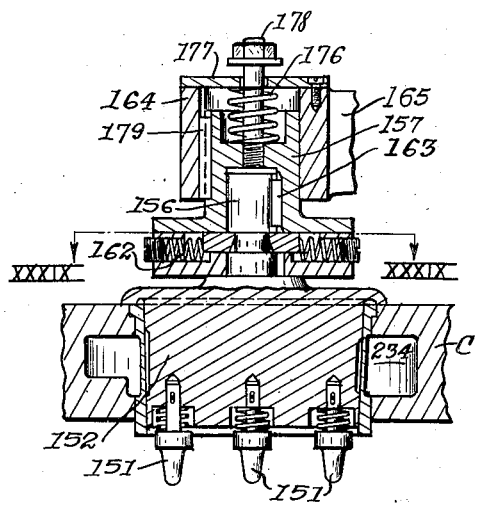
Figure 37 is a sectional elevation showing a plunger head.
Figure 38:
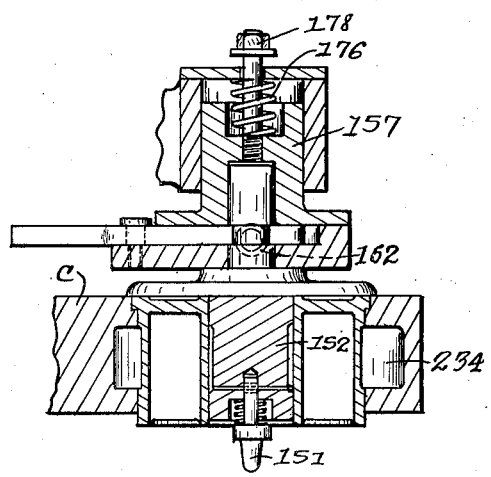
Figure 38 is a section of the same looking in a direction at right angles to that of Figure 37, the section being taken at the line XXXVIII—XXXVIII on Figure 39.
Figure 39:
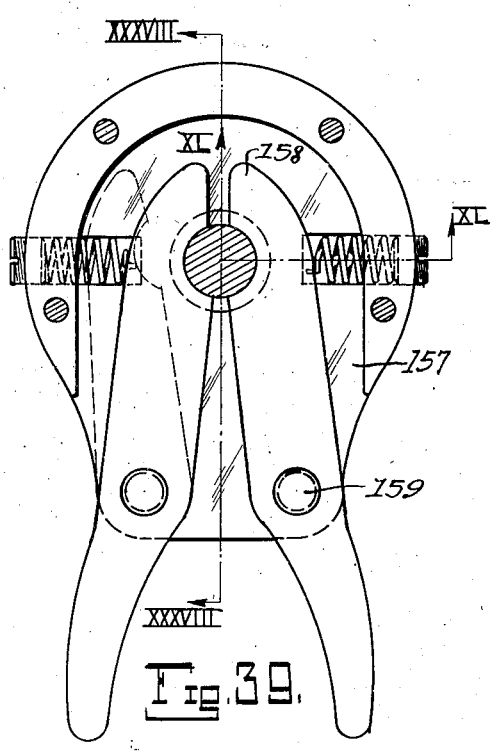
Figure 39 is a section at the line XXXIX—XXXIX on Figure 37.
Figure 40:
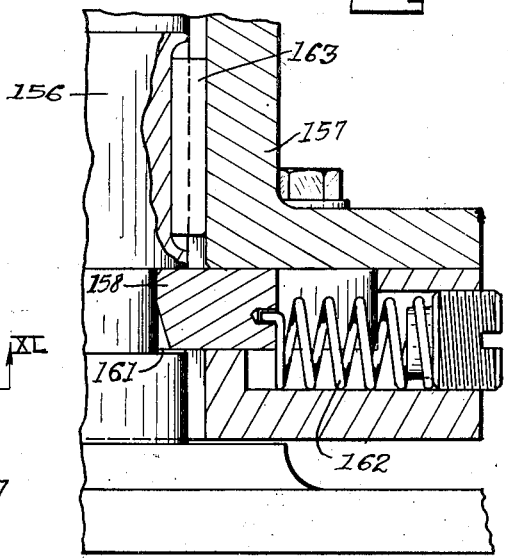
Figure 40 is a section at the line XL on Figure 39.

A yielding connection is provided between the cross head 165 and the chucks 157 (Figs. 37, 38). This comprises a coil spring 176 between the chuck and the cover plate 177 of the bearing sleeve 164. A screw bolt 178 threaded into the chuck 157 limits the vertical movement of the chuck in the cross head 165. A key 179 prevents rotative movement of the chuck in the bearing sleeve 164. The springs 176 hold the heads 152 with a yielding pressure against the head plate C, thereby forming an air tight connection while the air is being exhausted from the molds.

*Slide valve mechanism.*—The supply of air for blowing the blanks in the molds is controlled by slide valves 181. The mechanism for actuating these valves will be understood by reference to Figures 26 to 32 inclusive. For actuating these valves the gear segment 168 is provided with a cam slot 182 in which runs a cam roll 183 carried by a pair of rock arms 184 extending upward from a sleeve 185 keyed to a rock shaft 186 and straddling the gear segment. The shaft 186 is journalled in bearings 187 in the frame B. Rock arms 188 keyed to the rock shaft 186 transmit motion from said shaft to levers 189 mounted on said shaft and connected at their lower ends through links 191 to the valves 181. Each rock arm 188 is mounted between the forked ends of a lever 189. A rod 192 pivoted to the rock arm has mounted thereon a coil spring 193 which provides a yielding connection between the rock shaft and the lever 189.

When the gear segment 168 is moved from the Figure 26 position to the Figure 27 position to lift the plunger heads 164, the cam 182 operates through the arms 184 and levers 189 to move the slide valves 181 to operative position over the blow heads C, whereby air may be admitted to the blow heads for blowing the blanks. The spring connection (Fig. 30) permits the gear segment to operate independently of the valve in case of any obstruction, preventing movement of the valve to operative position, thereby acting as a safety device. The return movement of the valve, however, is positive to insure the same being withdrawn before the plunger descends.

*Cutting mechanism.*—The mechanism for severing the strings of glass which extend from the molds to the supply in the tank as the molds are lifted, is shown in detail in Figures 11 to 15 inclusive. This mechanism comprises knives 194 on knife arms 195 secured to the lower ends of rock shafts 196 mounted for both rocking and vertically reciprocating movements. The rocking movements are effected by a stationary cam 197 on which run cam rolls 198 on slide blocks 199 mounted to reciprocate radially of the machine in stationary guides 201. Links 202 connect said slide blocks with segmental gears 203 mounted on the frame members 70, said gears 203 meshing with gears 204 at the upper ends of the rock shafts 196. The connection between each link 202 and its gear 203 comprises a sleeve 205 connected by a pivot 206 to said gear, the link or rod 202 being slidable lengthwise in said sleeve. A coil spring 207 is mounted on the end of the rod 202 and holds said sleeve against an adjustable stop 208 on the rod. This provides a yielding connection between the knife and its operating cam, preventing excessive strain or breakage of parts if the knife encounters an obstruction during its cutting stroke. The movement of the knife in the reverse direction is positive.

By reference to Figure 11, it will be apparent that the two knives on each head or unit of the machine are operated in succession. The operating portion 197ª of the cam 197 is preferably so formed and the slide blocks 199 so spaced that the two knives will operate when the blank molds E with which they cooperate, have reached substantially the same position relative to the gathering tank. That is to say, as each mold E reaches the position indicated by the radial line 210, (Fig. 2), the cutting stroke of its knife takes place. The cut takes place when the mold has reached a position near the edge of the gathering tank, so that the chilled glass severed from the mold, falls back into the tank at a point outside of the gathering path. If desired, the two knives could evidently be operated simultaneously by using a single slide block and cam roll in place of the slide blocks 199 and rolls 198.

The up and down movements of the knives relative to the frame A are effected by a stationary cam 211 on which runs a cam roll 212 on a slide block 213 mounted for horizontal sliding movement radially of the machine in stationary guides 214. A plate 215 is connected by a pivot 216 to the slide block 213, said plate being formed with bearing lugs 217 and 217ª in which rods 218 are mounted to slide in the direction of their length. Said rods are connected by pivots 219 to forwardly extending rods 220 connected at their forward ends to rock arms 221 on rock shafts 222 journalled in the frame members 70. Secured to each rock shaft 222 is a horizontally disposed arm 223 connected at its outer end to a sleeve 224 mounted on the knife shaft 196. The knife shaft is adjustable up and down in said sleeve by means of a hand wheel 225 on a sleeve or nut 226 threaded on the shaft 196. A collar 227 connects said nut with the sleeve 224.

In the operation of the cutters, the cam 197 operates to swing each knife inward after the corresponding blank mold has received its charge and has been lifted from the main body of glass in the tank. This cutting stroke brings the knife to a position in contact with the bottom of the mold. After both knives have operated, the cam 197 operates to move the knives downward a short distance from the molds, as shown in Figure 4, in which position they are held during the blowing of the blanks in the blank molds. The rock shafts 196 are then rotated to swing the knives away from the molds.

A yielding connection is provided between the rods 218 and their bearing lugs 217 comprising coil springs 228 mounted on said rods between said lugs and collars 229 fixed to the rods in front of said lugs, and coil springs 231 mounted on the rods behind the lugs 217. The springs 231 are held between said lugs and nuts 232 adjustable to vary the tension of the springs. The springs 228 and 231 provide flexible connections through which the up and down movements are imparted to the knives and permit the cam to be so designed that it will insure the full up and down movement of the knives independently of any slight inaccuracies in the cam. They also prevent undue strain on the parts if any obstruction prevents the free up and down movement of the cutters. The springs 231 hold the knives with a yielding pressure against the bottoms of the blank molds during the cutting stroke. The lugs 217ª form stops for the collars 229 and thereby limit the downward movement of the cutters. The pivotal connection 216 maintains a balanced pressure between the rods 220.

Figure 12:
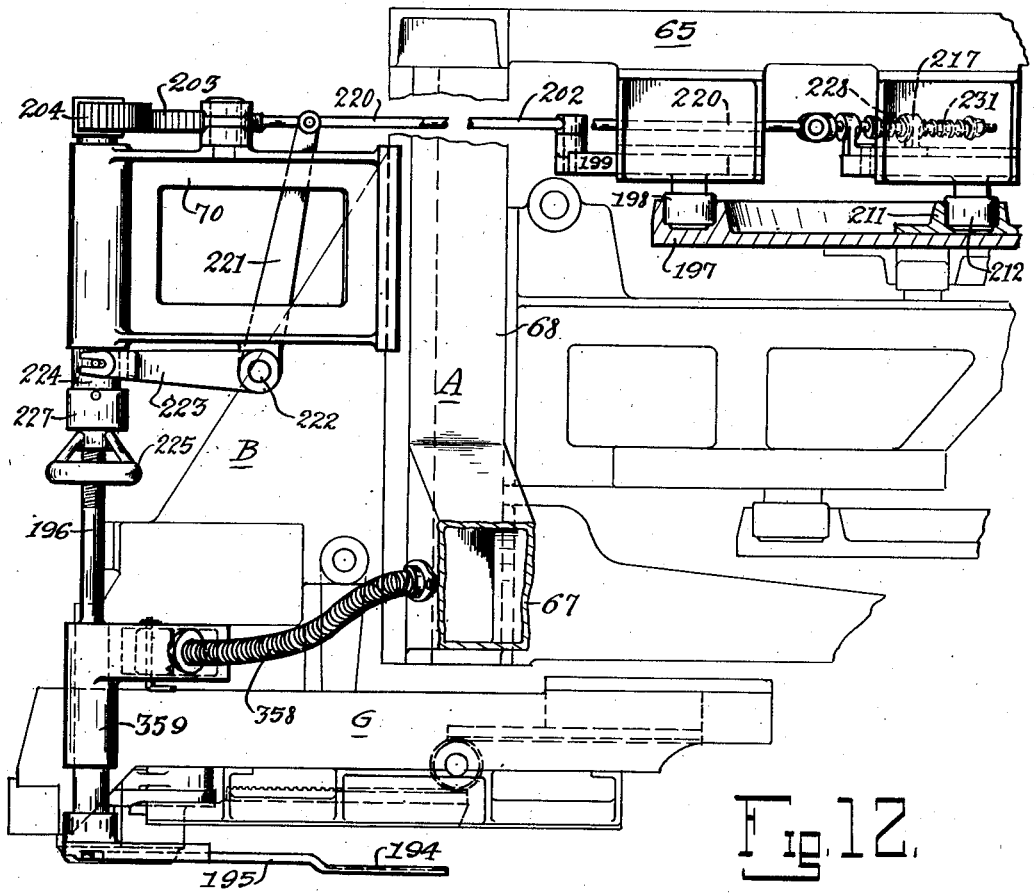
Figure 12 is a part sectional side elevation of the mechanism shown in Figure 11.
Figures 13, 14:
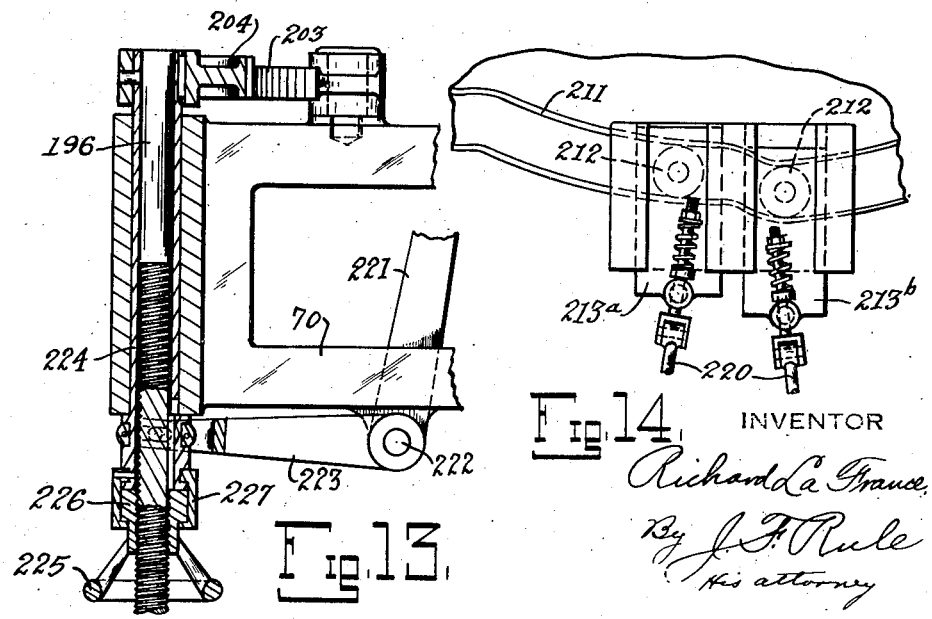
Figure 13 is a section at the line XIII—XIII on Figure 11.
Figure 14 is a plan view of a modified form of connection between the cutters and the cam which controls their drop movement away from the molds after the cutting movement, whereby the cutters may be lowered in succession, instead of simultaneously, as with the construction in Figure 11.

Figure 12 shows a modification in which separate slide blocks 213ª and 213ᵇ are provided in place of the single slide block 213 shown in Figure 11. With this arrangement, one of the two cutters on each head is lowered before the other as indicated in Figure 5, instead of both being lowered simultaneously. These slide blocks may be so spaced that the vertical movements of each cutter take place at the same rotative position of the mold carriage. It will be noted that with this arrangement, the length of time the knives are in contact with the molds is the same for all the molds.

*Vacuum system.*—When a blank mold is lowered into contact with the glass in the tank, as shown in Figure 26, the air is exhausted from the mold through air passages 233 (Fig. 34) in the plunger head 152, which at this time is in its lowered position, said passages 233 being in communication with the chamber 234 in the head C. An upright vacuum pipe 235 (Figs. 34 and 21) communicates at its lower end with the chamber 234 and at its upper end with a radially disposed pipe 236 opening into a pipe 237 (Fig. 1) leading from a distributing head 336 to a vacuum chamber 238. A valve 241 (Fig. 21) at the lower end of the pipe 235, controls the suction in the molds. The valve is carried on a stem 242 extending upwardly through the pipe 235 and is normally held in its closed position by a coil spring 243. The valve is actuated by a stationary cam 244 (Fig. 1) operating through connections comprising a lever 245, link 246, rock arms 247 and 248 (Figs. 21 to 25) on a rock shaft 249 journalled in an arm 251. The arm 248 as shown in Figures 22 to 24 comprises a section 252 hinged to swing laterally out of operative position. This section is keyed to a pivot pin 253 connected through a universal joint 254 to a hand rod 255 extending downward into convenient position to be operated by hand while the machine is running. The part 252 is normally held in its operative position by a leaf spring 256 which seats in a depression 257. A bolt 258 adjustable vertically in the arm 252 has a head 259 to engage the upper end of the valve stem 242 for periodically lowering the valve when the molds are to be charged. By rotating the hand rod 255, the arm 252 is swung out of operative position (see Fig. 24) so that the corresponding valve 241 remains closed. In this manner the vacuum connections to any unit or blank mold may be readily cut off for any desired length of time without interfering with the normal operation of the remaining units. This may be desirable for making repairs of changing molds, running the machine at less than full capacity, etc.

*Finishing mold operating mechanism.*— The finishing molds and their actuating mechanism will be understood by reference to Figures 1 and 43 to 49 inclusive. The finishing molds F for each head or unit are carried on a finishing mold frame 261 having trunnions 262 by which the frame is pivotally mounted on the mold carriage, permitting the frame to swing downward to the Figure 1 position for passing beneath the tank 133. After passing beyond the tank, the frame is swung upward to the horizontal position shown in Figure 46, and the finishing molds close around the blanks which at this time are suspended from the neck molds, the blanks being then blown to their final shape in the finishing molds. The swinging movements of the mold frame 261 are controlled by a stationary cam track 263 on which runs a roll 264 on the mold frame.

The mold frame 261 carries a pair of finishing molds F, each of which comprises an inner section 265 and an outer section 266 mounted to swing about a pivot 267 for opening and closing the mold. Said sections are respectively connected through links 268 to arms 269 and 270 having a pivot 271. The arm 269 is connected through a link 272 to an equalizing lever 273. The arm 270 is formed with a gear segment 274 running in mesh with a gear segment 275, the latter connected through a link 276 to the lever 273. The links 272 and 276 are separately adjustable in length for individually adjusting the mold sections to their closed position. The equalizing lever 273 is connected by a pivot 277 to a lever 278 pivoted at 279 to the mold frame. Each finishing mold frame carries a pair of the levers 278 and the operating connections just described between said levers and the molds. The levers 278 are connected through a pair of links 281 to a pivot pin 282 mounted in a slide bar 283 slidable radially of the machine in guides 284 on the mold frame. The slide 283 is actuated by a stationary cam 285 (Fig. 1) on which runs a cam roll 286 on a slide block 287 which has an operating connection 288 with the slide 283.

Figure 45:
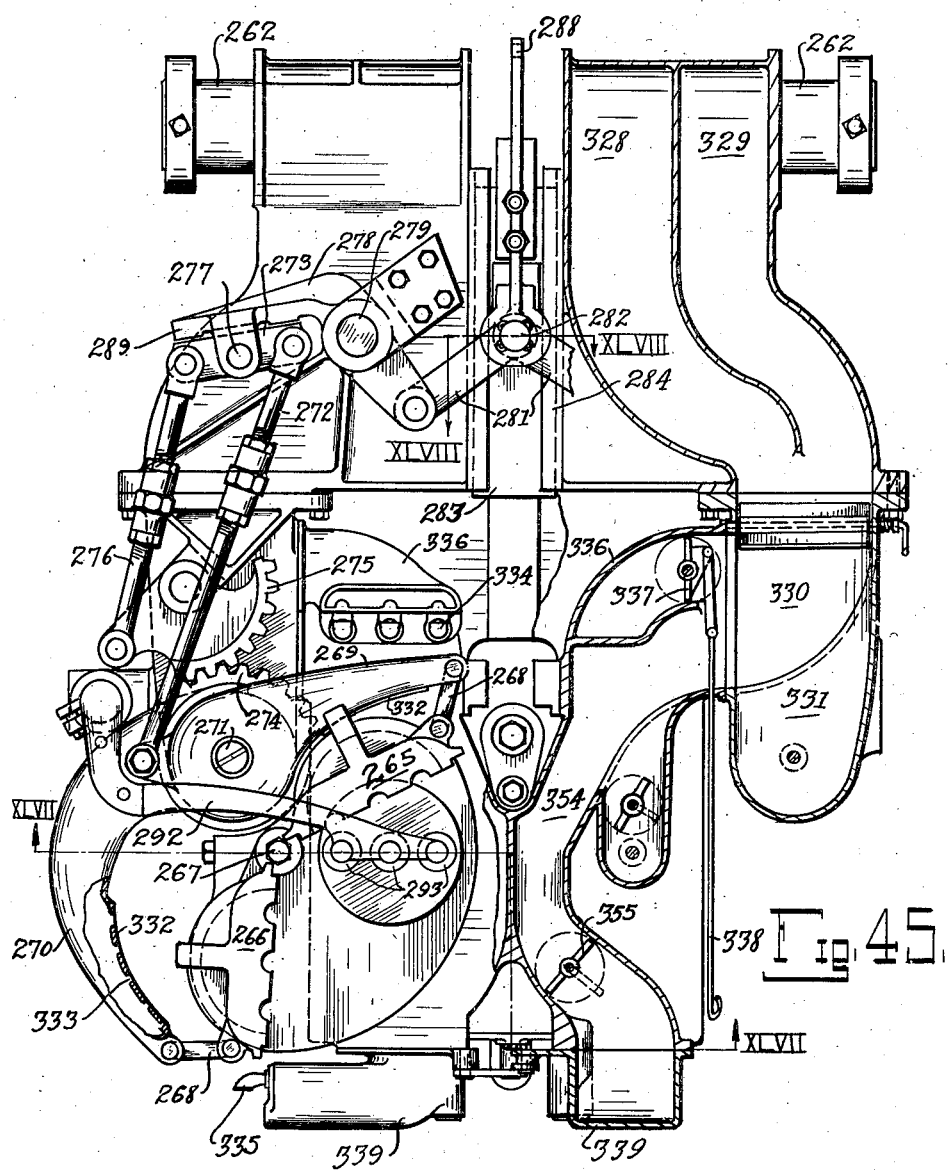
Figure 45 is a part sectional plan view of the finishing mold carrying frame, showing particularly the air connections, and also showing a finishing mold in open position.

The finishing molds are opened by an inward movement of the cam roll 286 which operates through the connections just described to move the parts from the position shown in Figure 43 to that shown in Figure 45. That is to say, as the slide 283 moves inward or toward the center of the machine, it operates through the links 281 to swing the levers 278 about their fulcrums. During this movement, the link 272 swings the arm 269 sufficiently to withdraw the mold section 265 to the Figure 45 position. At the same time, the link 276 operating through the gears 275 and 274 swings the mold section 266 through an arc of approximately 90 degrees to the Figure 45 position, out of the path of discharge of the finished bottles. The movement of the outer mold section 266 is considerably greater than that of the inner section, owing to the fact that the link 276 is connected to the lever 278 at a greater distance from the fulcrum 279 than the link 272. The arc through which the mold section 266 swings could also be varied by relatively varying the radii of the gear segments. The equalizing lever 273 has a limited movement about its fulcrum, determined by stops 289 on the lever 278. This permits a slight relative movement of the mold sections as the mold closes, so that said sections will automatically adjust themselves to their closed position.

In order to provide equalizing means in the operating connections for each pair of finishing molds, the pivot pin 282 (Figs. 43, 48 and 49) is mounted for a limited lateral movement in the slide block 283. The opening 291 in said block which receives the pivot pin is substantially rectangular, as shown in Figure 49, and somewhat longer than the diameter of the pivot pin to permit said lateral movement. With this arrangement, if either finishing mold reaches its closed position slightly in advance of the other mold and before the slide 283 has completed its movement, the connection just described will permit the final movement of the slide to be transmitted for completely closing the other mold.

The finishing molds F as shown in Figure 43 are arranged in pairs and the mold cavities are arranged in a line perpendicular to a radius of the machine extending between the molds, or the mold cavities may be arranged in the arc of a circle concentric with the axis of the machine. With this arrangement, the mold cavities during the rotation of the mold carriage all travel in the same or substantially the same arc. The blank mold cavities are arranged in the same manner and all travel in the same circle H (Fig. 2). It will thus be seen that the molds travel in substantially the same path through the glass in the tank during the gathering operation, so that glass of the same temperature and consistency is supplied to all the molds.

*Knock out arms.*—Referring particularly to Figures 46 to 52 inclusive, a pair of "knock-out" arms 292 are carried on each finishing mold frame. Each of these arms carries a series of knock-out disks 293 which temporarily hold the bottles 294 or other blown articles during the opening of the finishing molds. Each arm 292 is secured by a set screw $a$ (Fig. 47) to the upper end of a rock shaft 295 mounted for rotative movement in a non-rotating vertical rod or casting 296, the latter mounted to reciprocate vertically in a casing 297 secured to the mold frame. A roll 298 on the lower end of the rod 296 is engaged by the forked end of a rock arm 299 on the end of a rock shaft 301. This rock shaft, as shown in Figure 47, is journalled in bearings on hangers 302 depending from the mold frame. The rock shaft is arranged to actuate both knock-out arms through the connections just described. A rock arm 303 on the shaft 301 carries a roll 304 which runs on a stationary cam 305 (Figs. 47, 53 and 1).

The shaft 295 is held against endwise movement in the casting 296 by a shoulder 401 formed on said shaft, and nuts threaded on the lower end of the shaft. The knock-out arm 292 can be adjusted up or down on its shaft by loosening the set screw $a$ and rotating an adjusting disk or nut 402 threaded on the shaft 295. A rack bar 306 (Figs. 50, 51) is mounted to reciprocate in a guideway 307 extending transversely in the member 296. Rack teeth thereon mesh with a gear 308 formed on the hollow shaft 295. The rack bar carries a roll 309 which runs in a cam slot 311 formed in the front plate 312 of the casing 297.

Figure 46:
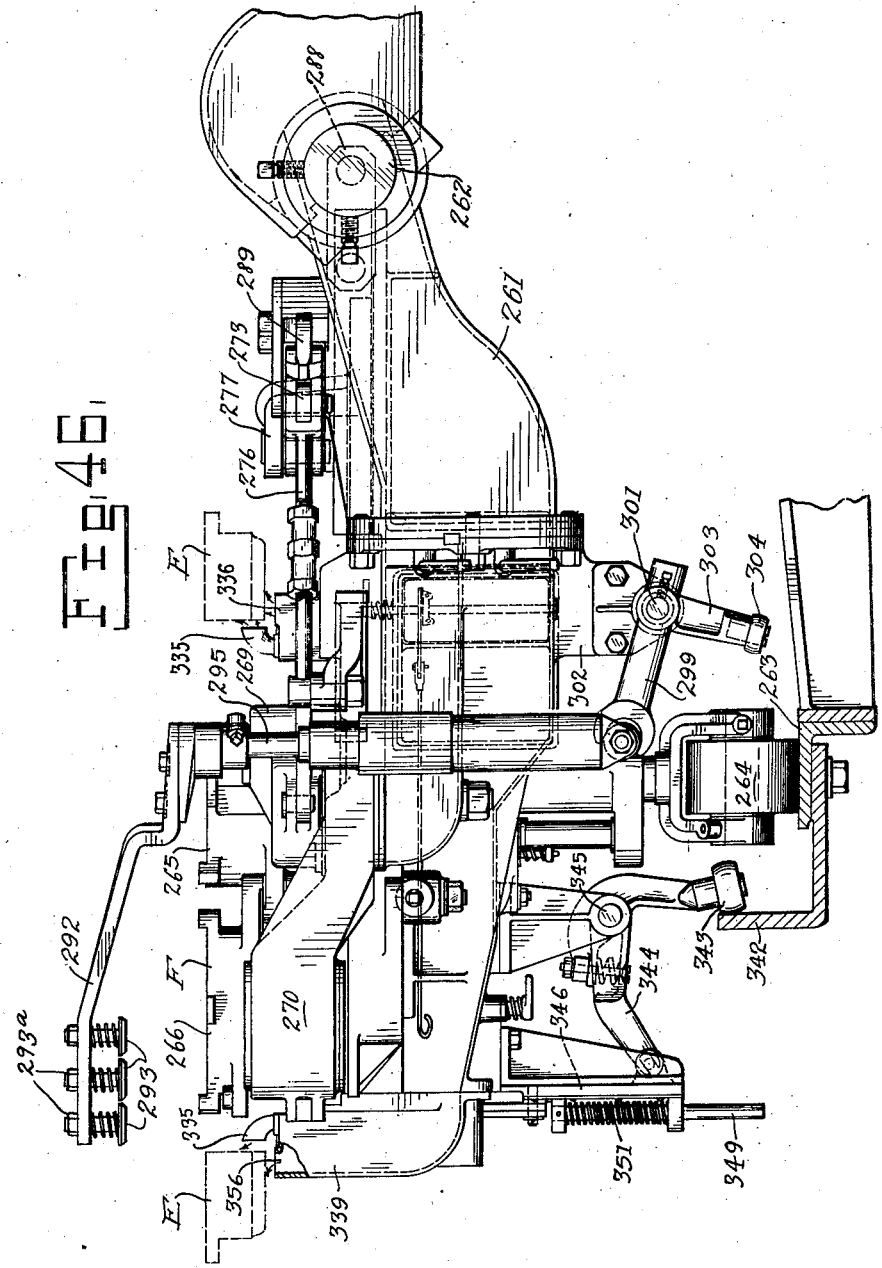
Figure 46 is a side elevation of the finishing mold frame, the open blank molds being shown in broken lines to indicate their position relative to the finishing mold.

The knock-out arms 292 are normally in their elevated outwardly swung position shown in Figures 43 and 46. Shortly before the finishing molds open to discharge the bottles, the arms are swung inward and downward to engage the knock-out disks with the bottles and hold them while the molds open. This takes place when the cam 305 engages the arm 303 and rocks the shaft 301, thereby pulling the rock shafts 295 downward. During this downward movement, the roll 309 (Fig. 52) travels along the inclined portion of the cam 311 so that the rack 306 is moved lengthwise and thereby rotates the shaft 295 and swings the knock-out arm inward during its downward movement. This swinging movement is completed before the disks 293 reach the bottles, the final movement, controlled by the vertical portion of the cam, being directly towards the bottles. The bottles are held by the disks during the opening of the finishing molds. When the mold sections have been swung open out of the path of the bottles, the knock-out arms are lifted and returned to the Figure 43 position. This return movement takes place when the rock arm 303 runs off the cam, and is effected by a coil spring 313 (Fig. 51) within the hollow rock shaft 295. This spring is held under compression between a screw plug 314 in the upper end of the shaft and a lug 315 on the member 297. A pin 316 projects upward from said lug within the coil spring to hold the latter in position.

The knock-out disks 293 may be so adjusted that all the disks on a pair of arms 292 disengage the bottles simultaneously when the arms are lifted, thereby permitting all the bottles on one head to drop at the same time. Sometimes, however, it is desirable to discharge the bottles one by one or in groups of two or more in succession. This can be done by individually adjusting the disks up or down on the arms 292, as by means of adjusting nuts 293ª (Fig. 46). The adjustment may be such that each bottle will be released at the same discharging position as the carriage rotates. The desired manner or order in which the bottles are discharged depends on the particular mechanism employed to handle the bottles as they are discharged.

*Air cooling system.*—Air for cooling the molds and other parts is supplied from any suitable source through a pipe 321 (Figs. 1 and 54) beneath the machine which, when the machine is in operating position, registers with a pipe section 322 carried on the machine frame. The pipe 322 telescopes with a funnel shaped pipe 323 which opens into air passages 324 in the frame member 61. The passages 324 communicate through openings 325 (Fig. 1) with air chambers 326 formed in the lower section of the mold carriage. Air is supplied from the chamber 326 through passageways 327 (Fig. 1) to channels 328 and 329 (Figs. 43 and 45) in the finishing mold frame. Air for cooling the blank molds is supplied through said channels to air chambers 330 opening into chambers 331 which open into the hollow arms 269 and 270. Said arms are provided on their inner faces with blow plates 332 having nozzles or openings 333 (Fig. 45) through which cooling air is blown against the finishing molds. The air ports between the chamber 331 and the arms 269 and 270 may, if desired, be so arranged that they will be automatically closed during the opening movement of said arms, so that the cooling air is supplied only when the finishing molds are closed.

The blank molds are cooled by means of air nozzles carried on the finishing mold frame and brought into position when said frame is swung upward. These include nozzles 334 and 335 (Figs. 43 and 45) for blowing air against the inner and outer sections respectively of the blank molds. The nozzles 334 are carried on pipe sections 336 opening into the chambers 330. The air supply to the nozzles 334 may be regulated or cut off by means of valves 337 actuated by hand rods 338.

The nozzles 335 are carried on swinging sections or blowers 339 (see Fig. 44) connected by pivots 341 to the mold frame. These blowers are swung upward from their inoperative position (Fig. 44) to their operative position (Fig. 46) by means of a stationary cam 342 on which runs a cam roll 343 on a bell crank lever 344 connected by a pivot 345 to the mold frame. The bell crank lever at its forward end engages a slide 346 movable vertically in guides 347, said slide being connected at its upper end through links 348 to the blowers 339. The slide 346 carries a rod 349 on which is mounted a coil spring 351. The cam 342 operates through the bell crank lever to depress the slide plate 346, thereby swinging the blowers upward and compressing the spring 349. This upward movement of the blowers brings the openings 352 (Fig. 44) formed in the inner faces of the blowers, into register with corresponding openings 353 (see also Fig. 47) at the outer ends of channels 354 (Fig. 45) formed in the mold frame and communicating with the air chambers 330. Hand operated valves 355 are provided in the channels 354 for individually controlling the supply of air to the blowers 339.

The nozzles 334 and 335, as shown in Figure 46, are in position to blow cooling air against the blank molds E while the latter are in their open position. The blowers 339 are at this time held in their upward position by the cam 342. The blowers (see Fig. 46) are provided with blow openings 356 in addition to the nozzles 335, arranged to blow air upward against the bottoms of the blank molds. When the finishing mold frame is swung downward, the blowers 339, which at this time are not under the control of the cam, are also swung down by their spring 351 to the Figure 44 position, thereby shutting off the air supply and holding the blowers in position to prevent interference with the discharge of the bottles.

Air for cooling the plungers is supplied from the chamber 326 (Fig. 1) through the vertical column 357 and member 67 in the frame A (see Fig. 12). Flexible pipes 358 convey the air from the frame A to the hollow brackets 359 (Fig. 15) of the cut-off mechanism. From thence the air is conveyed through channels 361 and passages 362 to plunger cooling nozzles 363. These nozzles are in position to blow cooling air on the plunger heads when the plunger 166 is lifted.

Figure 33:
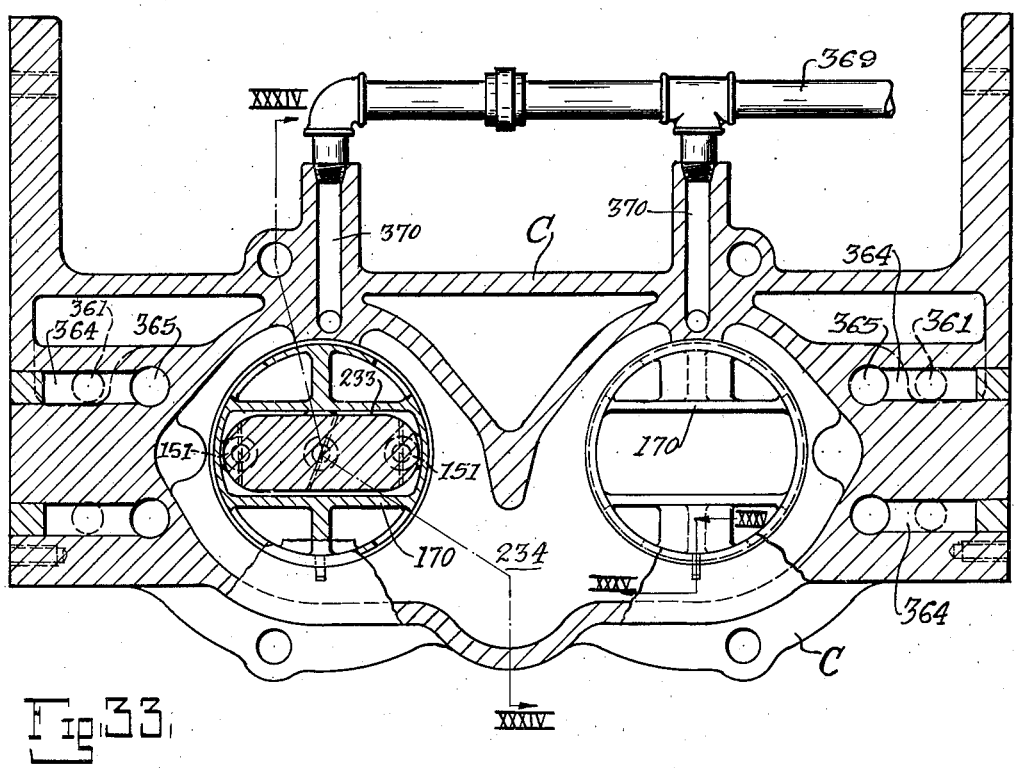
Figure 33 is a section at the line XXXIII—XXXIII on Figure 26.
Figure 34:
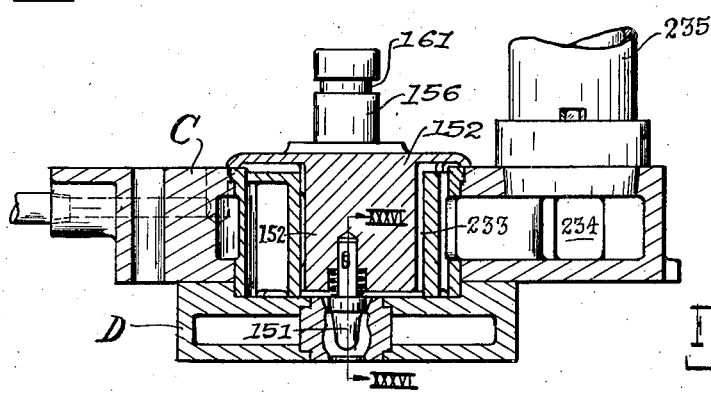
Figure 34 is a section at the line XXXIV—XXXIV on Figure 33.

Air for cooling the neck molds is supplied through the channel 361 and passageways 364 and 365 (Figs. 17 and 33). The cooling air is supplied to the neck molds while the latter are closed, and is automatically cut off (by the movement of the mold across the bottom of passageway 365) when the neck molds are opened. This arrangement permits cooling air to be supplied a greater portion of the time, as the neck molds are only open a comparatively short time.

The distributing head 366 (Fig. 1) may be similar in construction and operation to that disclosed in my Patent Number 1,277,607, granted September 3, 1918. It comprises separate chambers connected respectively to air, vacuum and combustible gas. These chambers communicate respectively with an air chamber 367, the vacuum chamber 238 and gas chamber 368, which rotate with the mold carriage.

Air for blowing the glass in the molds is supplied from the pressure chamber 367 through a pipe line 369 (Figs. 1, 26, 27 and 33) leading to the blow head C. When the slide valve 181 is in the Figure 27 position, the air is admitted through said valve and the head C to the mold. When the slide valve is withdrawn, it closes the port 370, thereby cutting off the air supply. The air supply to the molds is further controlled by a valve 371 (Fig. 1) actuated by a lever 372 controlled by a stationary cam 373.

*Operation.*—The operation may be summarized as follows: The mold carriage is rotated continuously from any suitable source of power operating through driving mechanism including a ring gear 374 (Fig. 1). As each head or unit is brought over the tank 133, the frame B on said head is lowered by its cam 134 (Figs. 1 and 41), thereby dipping the blank molds into the molten glass in the tank. The vacuum controlling valve 241 (Fig. 21) is now opened by its cam 244 (Fig. 1) so that the air is exhausted from the blank molds through the head C, whereby the glass is drawn upward by suction to fill the molds (Fig. 26). The plunger 166 carrying the plunger heads 152 and tips 151 (Figs. 37, 38), is lowered so that said tips project into the neck molds prior to the gathering of the glass into the molds to form initial blow openings in the blanks. After the glass has been drawn into the molds, the frame B is lifted and the cutters 194 are operated to sever the glass. The plunger is now withdrawn by means of the cam 175 operating through the gear segments 168 (Figs. 26, 27). The cam 182 in the gear segment at the same time operates to shift the slide valve 181 to the Figure 27 position, admitting air through the head C to blow the blanks in the blank mold. The cam 91 now operates (see Figs. 1, 7, 8) the frame sections F and G to separate the blank mold sections 80 and 81, leaving the bare blanks supported in the neck molds. The finishing mold frame 261 (Figs. 1 and 46) is then swung upward and the finishing molds F close around the bare blanks. The valve 371 (Fig. 1) is now opened by its cam 373 to supply air under pressure through the pipe line 369 (Figs. 1 and 27) and through the head C for blowing the blanks to finished form in the molds. The neck molds D are then opened, after which the knock-out arms 292 (Figs. 47 and 51) are swung inward and downward to engage the upper ends of the bottles which are left protruding from the finishing molds after the neck molds open. The finishing molds F are now opened, and the knock-out arms are then lifted to release the bottles which drop by gravity from the machine.

Modifications may be resorted to within the spirit and scope of my invention.

What I claim is:

1. In a machine for forming glass articles, the combination of a rotating mold carriage comprising a plurality of heads or units, a plurality of suction gathering molds on each head arranged to travel in substantially the same path, means to simultaneously move said molds into gathering position, a plurality of cutters on each head cooperating with the molds to sever the glass extending from the molds after the glass has been gathered, and means to operate the cutters on each head in succession.

2. The combination of a gathering tank to contain molten glass, a glass forming machine comprising a rotating mold carriage, a plurality of dipping heads thereon, each carrying a plurality of suction gathering molds, a plurality of cutters on each head cooperating with the molds, means to dip the molds into the glass in the tank and gather by suction, and means to operate the knives on each head in succession, each knife operating to sever the string of glass depending from the mold when the mold has reached a position to permit the severed glass to drop back into the tank beyond the range of the gathering surface in the tank.

3. The combination with means for maintaining a circulation of glass past a gathering area, of a glass forming machine comprising a plurality of heads each carrying a plurality of suction gathering molds, a plurality of cutters on each head cooperating respectively with said molds, means to bring the molds into contact with the molten glass at the gathering area and gather by suction as the carriage rotates, and means to operate each cutter after the mold with which it cooperates has passed beyond the gathering area.

4. The combination with means for maintaining a circulation of glass past a gathering area, of a glass forming machine comprising a plurality of heads each carrying a plurality of suction gathering molds, a plurality of cutters on each head cooperating respectively with said molds, means to bring the molds into contact with the molten glass at the gathering area and gather by suction as the carriage rotates, and means to operate the cutters on a head in succession, the cutting operations being timed and arranged to cause the severed glass dropping from each mold to re-enter the pool of glass at a point beyond the gathering area.

5. In a glass forming machine, the combination of a rotating mold carriage, a plurality of heads thereon, a plurality of molds carried by each head, a plurality of knives on each head, a knife operating cam, and operating connections between the cam and knives for operating the knives on each head in succession.

6. In a glass forming machine, the combination of a rotating mold carriage, a plurality of heads thereon, a plurality of molds carried by each head, a plurality of knives on each head, a knife operating cam, and means between said cam and knives for operating the latter in succession, the operation being timed to cause each knife to operate when the corresponding mold has reached the same position during the rotation of the mold carriage.

7. In a glass forming machine, the combination of a rotating mold carriage, a plurality of heads thereon, a plurality of molds carried by each head, a plurality of knives on each head, a knife operating cam, slide blocks on each head, cam engaging rolls on said blocks to cooperate with said cam, and connections between each knife and one of the slide blocks for imparting a cutting stroke to the knife.

8. In a glass forming machine, the combination of blank molds, plunger tips to enter said molds and form initial blow openings in the glass blanks in the molds, heads carrying said tips, a plunger comprising a cross arm, means connecting said heads to said arm for lifting and lowering the heads with the plunger, said connecting means comprising springs permitting each head to yield upwardly under pressure.

9. A glass forming machine comprising a pair of suction gathering blank molds, a pair of heads, plunger tips thereon arranged to enter the molds, a plunger having a cross arm, spring connections between said arm and said heads, a member having channels communicating with the mold cavities and through which the air is exhausted from the molds for charging the latter with glass, said heads arranged to project through said member to hold the plunger tips in position while the molds are charged, said flexible connections arranged to permit an air tight seal between said heads and said member.

Signed at Toledo, in the county of Lucas and State of Ohio, this 16th day of April, 1924.

RICHARD LA FRANCE.